(12) United States Patent
Sasaki et al.

(10) Patent No.: US 6,308,010 B1
(45) Date of Patent: Oct. 23, 2001

(54) WIRING STRUCTURE OF AN IMAGE STABILIZER

(75) Inventors: Takamitsu Sasaki; Yukio Uenaka, both of Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/565,449

(22) Filed: May 5, 2000

(30) Foreign Application Priority Data

May 10, 1999 (JP) .................................................. 11-128017

(51) Int. Cl.[7] .................................................. G03B 17/00
(52) U.S. Cl. .................................................. 396/52; 396/54
(58) Field of Search .................................. 396/52, 54, 55, 396/542; 348/208; 359/554–557; 250/216, 208.1, 201.1, 201.2

(56) References Cited

U.S. PATENT DOCUMENTS

| | | | | |
|---|---|---|---|---|
| 4,596,454 | * | 6/1986 | Kawai et al. ........................ | 354/286 |
| 4,864,348 | * | 9/1989 | Fujiwara et al. .................... | 354/485 |
| 5,266,988 | * | 11/1993 | Washisu ............................... | 354/70 |
| 5,463,443 | * | 10/1995 | Tanaka et al. ....................... | 354/430 |
| 5,559,571 | * | 9/1996 | Miyamoto et al. .................. | 354/286 |
| 5,583,597 | * | 12/1996 | Enomoto .............................. | 396/55 |
| 5,602,675 | * | 2/1997 | Okada .................................. | 359/554 |
| 5,619,735 | * | 4/1997 | Kai ....................................... | 396/55 |
| 5,633,756 | * | 5/1997 | Kaneda et al. ....................... | 359/554 |
| 5,655,158 | * | 8/1997 | Kai ....................................... | 396/55 |
| 5,659,806 | * | 8/1997 | Miyamoto et al. .................. | 296/54 |
| 5,680,251 | * | 10/1997 | Kato et al. ............................ | 359/557 |
| 6,035,131 | | 3/2000 | Washisu . | |

* cited by examiner

Primary Examiner—Robert H. Kim
Assistant Examiner—Hoon K. Song
(74) Attorney, Agent, or Firm—Greenblum & Bernstein, P.L.C.

(57) ABSTRACT

A wiring structure of an image stabilizer includes a movable member which supports an image-stabilizing optical system, a cylindrical base which supports the movable member, a first drive device which drives the movable member in a first direction, a second drive device which drives the movable member in a second direction, first and second electrical elements associated with the first and drive devices, respectively, and a flexible printed wiring board which has one end positioned inside the cylindrical base and is provided with first and second wiring strips which firstly extend in opposite directions away from each other along the circumferential direction about the optical axis, and subsequently fold back inwardly towards each folded portion of each respective second and first wiring strips, to be connected with first and second electrical elements, respectively, after intersecting each other as viewed along the optical axis.

24 Claims, 17 Drawing Sheets

WIRING STRUCTURE OF AN IMAGE STABILIZER

BACKGROUND OF THE INVENTION

1. Field of the Invention

The present invention relates to a wiring structure of an image stabilizer provided in an optical instrument such as a camera, a pair of binoculars or the like, wherein the image stabilizer is provided with an image-stabilizing optical system which is driven to prevent the object image in the optical instrument from shaking due to hand movement.

2. Description of the Related Art

Optical instruments such as cameras, binoculars or the like, which are provided with an image stabilizer having a vibration compensation function are well known. The image stabilizer is provided with an image-stabilizing optical system and operates to compensate the shaking of the object image (hereinafter referred to as "image shake") in the optical instrument by driving the image-stabilizing optical system in a plane perpendicular to the optical axis thereof. In such a conventional image stabilizer which uses coils and permanent magnets to drive the image-stabilizing optical system, the coils and position detect sensors are fixed to a movable frame which supports the image-stabilizing optical system, so that electrical wires extend from the coils and the position detect sensors.

A flexible printed wiring board is mainly used as the electrical wires. Conventionally, part of the flexible printed wiring board which is positioned adjacent to the movable frame of the image-stabilizing optical system is bent to absorb the deflection stress of the flexible printed wiring board that is caused by the movement of the movable frame.

According to such a conventional structure providing the aforementioned part of the flexible printed wiring board with a mere bent portion to absorb deflection stress, the strong resilient force of the flexible printed wiring board at the bent portion often prevents the movable frame (the image-stabilizing optical system) from moving smoothly. Moreover, since the bent portion of the flexible printed wiring board bulges towards the movable frame, a large space for accommodating the bent portion in the optical instrument provided therein with the image stabilizer is required. This increases the size of the optical instrument.

SUMMARY OF THE INVENTION

The primary object of the present invention is to provide a wiring structure of an image stabilizer which makes it possible to minimize the resilient force of the flexible printed wiring board to reduce the influence of the resilient force on the movement of the image-stabilizing optical system while minimizing the space necessary for disposing the flexible printed wiring board.

To achieve the object mentioned above, according to an aspect of the present invention, a wiring structure of an image stabilizer is provided, including a movable member which supports an image-stabilizing optical system, a cylindrical base which supports the movable member to be movable in a plane perpendicular to an optical axis of the image-stabilizing optical system, a first drive device which drives the movable member in a first direction perpendicular to the optical axis, a second drive device which drives the movable member in a second direction perpendicular to the optical axis, the first direction and second direction being orthogonal to each other, a first electrical element associated with the first drive device and a second electrical element associated with the second drive device which are separately mounted on the movable member being spaced in the circumferential direction about the optical axis, and a flexible printed wiring board, one end and the other end of which are positioned inside and outside of the cylindrical base, respectively. The one end of the flexible printed wiring board is provided with a first wiring strip and a second wiring strip which firstly extend in opposite directions away from each other along the circumferential direction about the optical axis, and subsequently fold back inwardly towards each folded portion of each respective second and first wiring strips, to be connected with the first electrical element and the second electrical element, respectively, after intersecting each other as viewed along the optical axis.

According to this structure, those wiring portions of the first and second wiring strips which extend between the movable member and the cylindrical base become sufficiently long and thus do not bend very much even if the movable member moves to a movable limit position thereof in either the first or second direction. Therefore, the influence of the resilient force of each of those wiring portions on the movable member while it is moving can be made minimal.

Moreover, no bent portion which bulges towards the movable member is formed on either the first or second wiring strip, it is not necessary to secure a large space for disposing the first and second wiring strips. Furthermore, there is no fear that the smooth movement of the movable member be interrupted by a strong resilient force of such a bent portion which bulges towards the movable member.

Preferably, each of the first wiring strip and the second wiring strip includes a S-shaped portion in a vicinity of an intersecting portion thereof so that the first wiring strip and the second wiring strip sidestep each other in the direction of the optical axis, respectively.

Preferably, the cylindrical base includes a peripheral wall which is formed along a circumferential portion thereof. Each of the first wiring strip and the second wiring strip includes an outer strip portion positioned along an outer peripheral surface of the peripheral wall of the cylindrical base, and an inner strip portion which is folded back inwardly to be positioned inside the cylindrical base; and the inner strip portion of the first wiring strip and the inner strip portion of the second wiring strip intersect each other as viewed along the optical axis.

Preferably, the inner strip portion of the first wiring strip includes at least one S-shaped portion which is curved so as to bend in the direction of the optical axis so that the inner strip portion of the second wiring strip sidesteps in the direction of the optical axis; and the inner strip portion of the second wiring strip includes at least one S-shaped portion which is curved so as to bend in the direction of the optical axis so that the inner strip portion of the first wiring strip sidesteps in the direction of the optical axis.

Preferably, a portion of the inner strip portions of the first and second wiring strip, other than the intersecting portion, overlap each other in the radial direction of the cylindrical base.

Preferably, the first drive device includes a first magnet fixed to one of the cylindrical base and the movable member, and a first coil fixed to the other of the cylindrical base and the movable member to face the first magnet. In this case, the second drive device includes a second magnet fixed to the one of the cylindrical base and the movable member, and a second coil fixed to the other of the cylindrical base and the movable member to face the second magnet.

In an embodiment, the first magnet and the second magnet are fixed to the cylindrical base, and the first coil and the second coil are fixed to the movable member to face the first and second magnets, respectively. The first electrical element and the second electrical element include the first coil and the second coil, respectively.

Preferably, the first drive device further includes a first position detector for detecting a variation in position of the movable member relative to the cylindrical base in the first direction, and the second drive device further includes a second position detector for detecting a variation in position of the movable member relative to the cylindrical base in the second direction.

Preferably, the first position detector includes a first light emitter fixed to one of the cylindrical base and the movable member, and a first one-dimensional PSD fixed to the other of the cylindrical base and the movable member, and the second position detector includes a second light emitter fixed to the one of the cylindrical base and the movable member, and a second one-dimensional PSD fixed to the other of the cylindrical base and the movable member.

In an embodiment, the first light emitter and the second light emitter are fixed to the movable member, and the first and second one-dimensional PSD are fixed to the cylindrical base. The first electrical element and the second electrical element include the first light emitter and the second light emitter, respectively.

In an embodiment, the first light emitter and the second light emitter are fixed to the cylindrical base, and the first one-dimensional PSD and the second one-dimensional PSD are fixed to the movable member, and the first electrical element and the second electrical element include the first one-dimensional PSD and the second one-dimensional PSD, respectively.

Preferably the first light emitter and the second light emitter is an LED.

Preferably, a yoke plate fixed to the cylindrical base is also included, the movable member being positioned between the yoke plate and the cylindrical base.

Preferably, the cylindrical base includes at least one projection and the yoke plate includes corresponding at least one limit stop at which the at least one projection abuts against at the time the movable member moves to a movable limit position thereof relative to the cylindrical base.

Preferably, the image stabilizer is incorporated in a camera. Preferably, the camera includes first and second gyro sensors for sensing vibration in the first direction and the second direction, respectively, and a controller which supplies drive current to each of the first coil and the second coil. The strength of the drive current is determined in accordance with output of each of the first and second gyro sensors.

Preferably, the image stabilizer is formed as a unit.

According to another aspect of the present invention, a wiring structure of an image stabilizer is provided which includes a movable member which supports an image-stabilizing optical system, a cylindrical base which supports the movable member to be movable in a plane perpendicular to an optical axis of the image-stabilizing optical system, a first drive device which drives the movable member in a first direction perpendicular to the optical axis, a second drive device which drives the movable member in a second direction perpendicular to the optical axis, the first direction and second direction being orthogonal to each other, a first electrical element associated with the first drive device and a second electrical element associated with the second drive device which are separately mounted on the movable member being spaced in the circumferential direction about the optical axis, a first wiring strip which extends into the cylindrical base from the outside thereof to be connected to the first electrical element, and a second wiring strip which extends into the cylindrical base from the outside thereof to be connected to the second electrical element. The first wiring strip and the second wiring strip are positioned inside the cylindrical base with the first wiring strip intersecting the second wiring strip as viewed along the optical axis.

Preferably, the first wiring strip and the second wiring strip extend from a common flexible printed wiring board in opposite directions so as to be separate from each other along a circumferential direction about the optical axis.

Preferably, the cylindrical base includes a peripheral wall which is formed a circumferential portion thereof, and each of the first wiring strip and the second wiring strip is disposed along a peripheral wall of the cylindrical base.

Preferably, the image stabilizer is incorporated in a camera.

According to another aspect of the present invention, a wiring structure of an image stabilizer is provided including a movable member which supports at least one lens group, the movable member being supported so as to be movable in a plane perpendicular to an optical axis of the at least one lens group, and a strip of flexible printed wiring board, one end of which is connected to the movable member. The one end of the strip of the flexible printed wiring board is bifurcated to provide a first wiring strip and a second wiring strip which firstly extend in opposite directions away from each other along a circumferential direction about the optical axis, and subsequently fold back inwardly towards each folded portion of each respective second and first wiring strips, to be connected to the movable member after intersecting each other as viewed along the optical axis.

Preferably, a first electrical element and a second electrical element are separately mounted on the movable member spaced in the circumferential direction, and wherein the first wiring strip and the second wiring strip of the flexible printed wiring board are connected to the first electrical element and the second electrical element, respectively.

Preferably, the wiring structure of an image stabilizer further includes a first drive device which drives the movable member in a first direction perpendicular to the optical axis, and a second drive device which drives the movable member in a second direction perpendicular to the optical axis, the first direction and second direction being orthogonal to each other. The first drive device includes the first electrical element and the second drive device includes the second electrical element.

The present disclosure relates to subject matter contained in Japanese Patent Application No.11-128017 (filed on May 10, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 15:
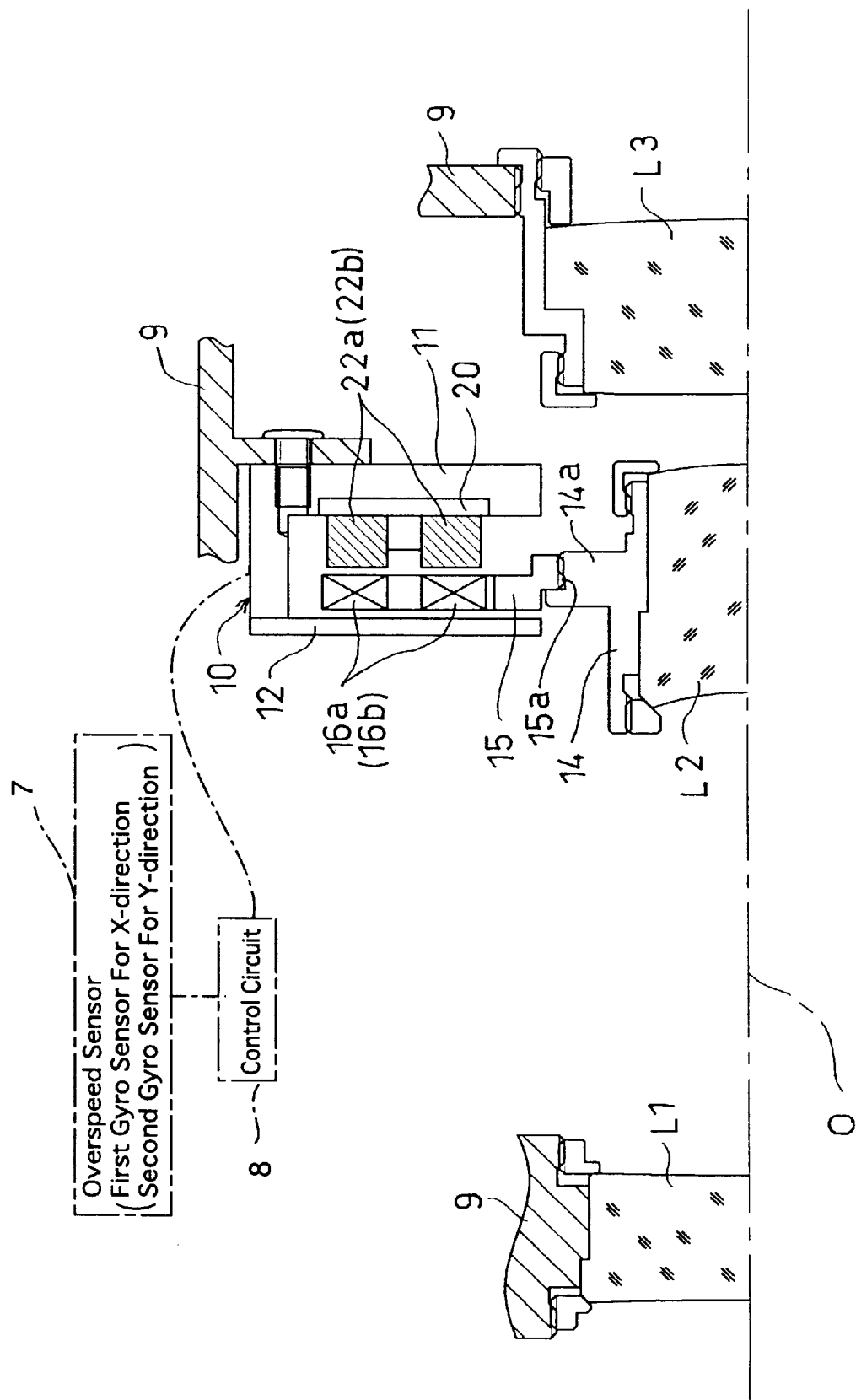
FIG. 15 is a schematic cross sectional view of a photographic optical system and the image stabilizer unit, showing an upper half thereof from the optical axis.

FIG. 15 shows an arrangement of a photographic optical system and an image stabilizer to which the present invention is applied. The photographic optical system and the image stabilizer are positioned within a camera body (not shown), e.g., a camera body of a lens-shutter type of camera. The photographic optical system includes a first lens group L1, a second lens group (image-stabilizing optical system) L2 and a third lens group L3. The image stabilizer to which the present invention is applied operates to compensate the shaking of the object image (hereinafter referred to as "image shake"), focused on a film plane (not shown) through the photographic optical system, by driving the second lens group L2 in a plane perpendicular to the optical axis 0 of the photographic optical system. The second lens group L2 is driven in a plane perpendicular to the optical axis 0 by an image stabilizer unit 10, whose outward appearance is shown in FIG. 2.

In the image stabilizer unit 10, the term 'forward' expresses a direction toward object (i.e., left in FIG. 15) and the term 'rearward' expresses a direction toward an image plane of the photographic optical system (i.e., right in FIG. 15).

The camera is provided therein with an overspeed sensor 7 (see FIG. 15) which includes a first gyro sensor (vibration sensor) for exclusively sensing vibration or shake in the X-direction (horizontal direction) and a second gyro sensor (vibration sensor) for exclusively sensing vibration or shake in the Y-direction (vertical direction) perpendicular to the X-direction. The first and second gyro sensors together sense vibration or shake of the camera body caused by the hand movement of the user. The camera is further provided therein with a control circuit 8 which supplies drive current whose strength is determined in accordance with the output of the overspeed sensor 7 to coils (first and second coils 16a and 16b) positioned in the image stabilizer unit 10. The control circuit 8 calculates an amount of movement of the second lens group L2 that is necessary for compensating the image shake in accordance with the output of the overspeed sensor 7, and performs a feedback control to calculate the same in accordance with the output of the overspeed sensor 7. The image stabilizer unit 10, the first lens group L1 and the third lens group L3 are fixed to a stationary member 9 of a lens barrel of the camera.

Figure 1:
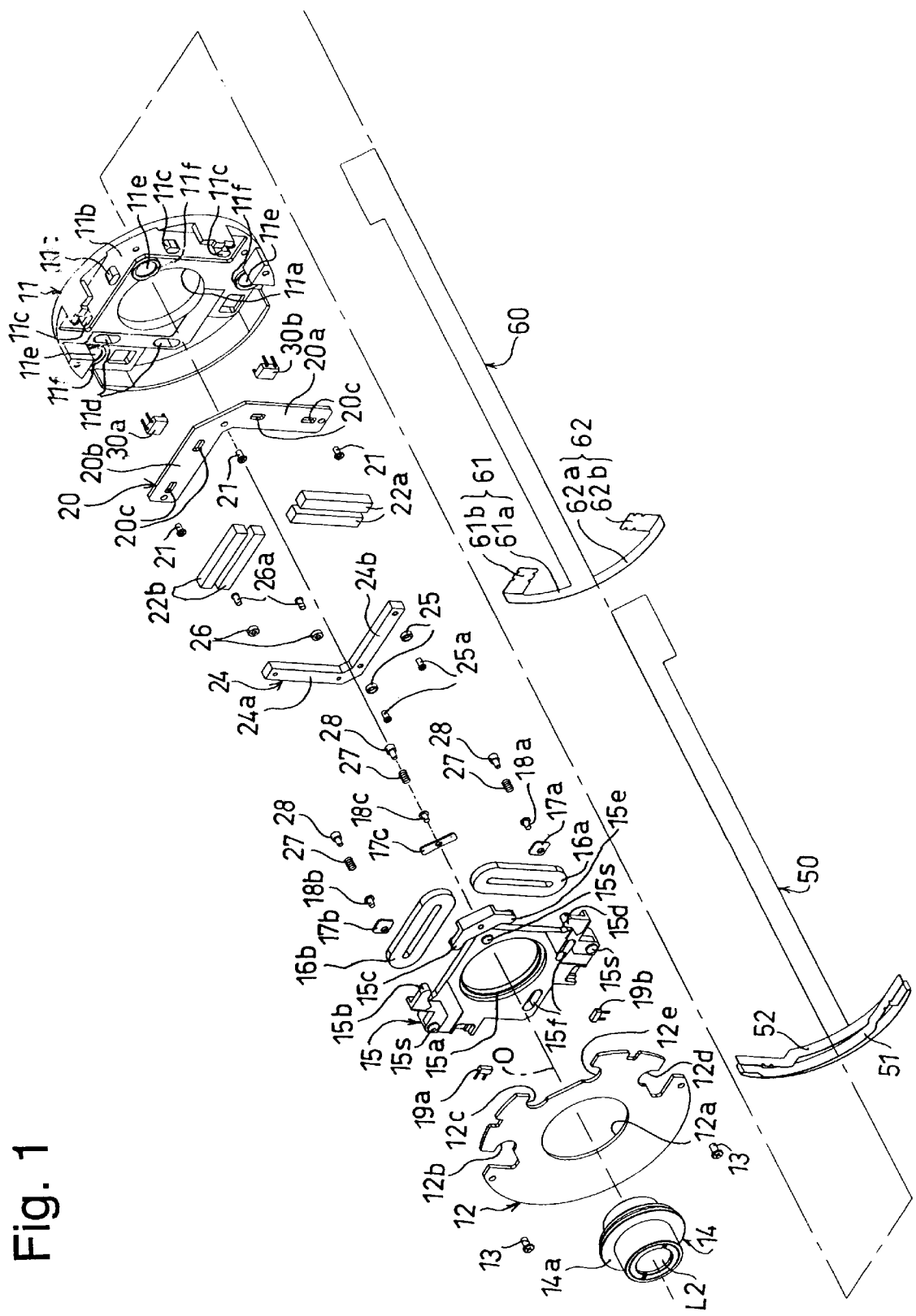
FIG. 1 is an exploded perspective view of an embodiment of an image stabilizer unit to which the present invention is applied.
Figure 2:
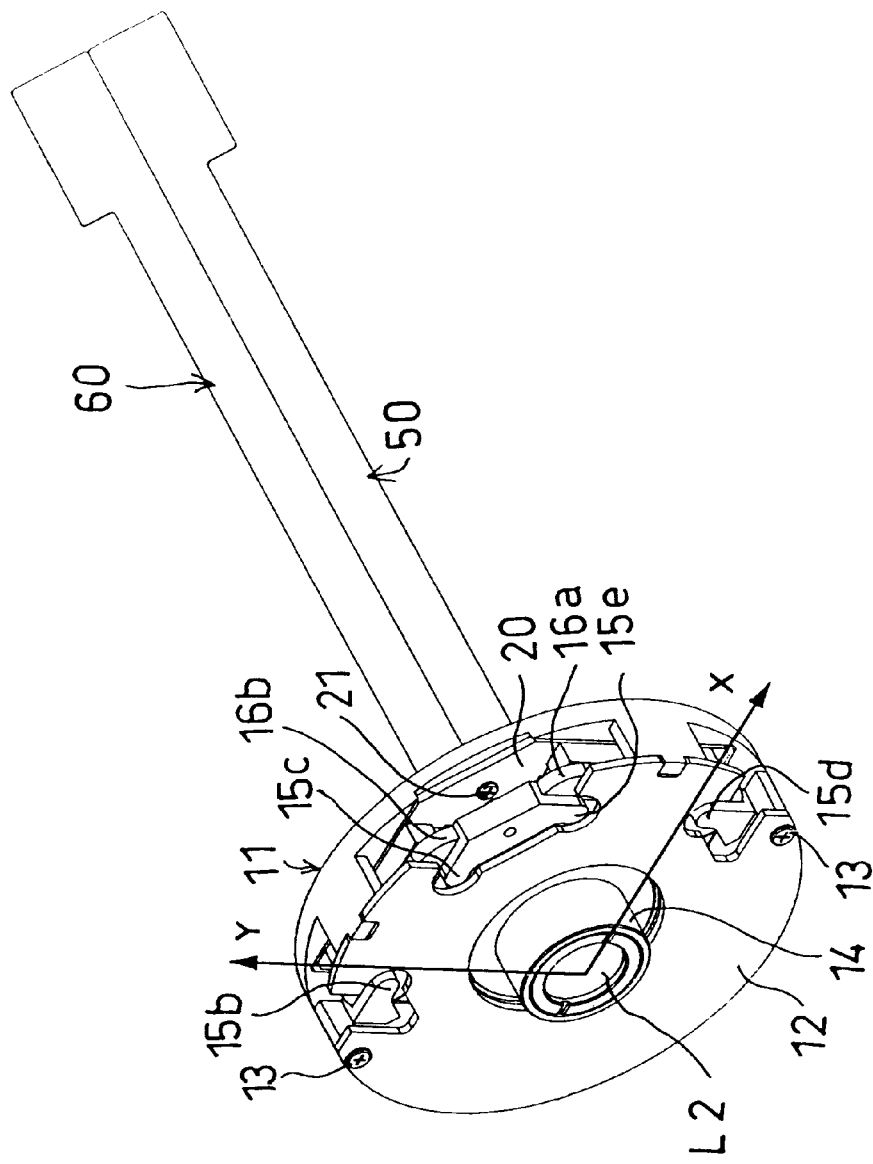
FIG. 2 is a perspective view of the image stabilizer unit shown in FIG. 1.
Figure 3:
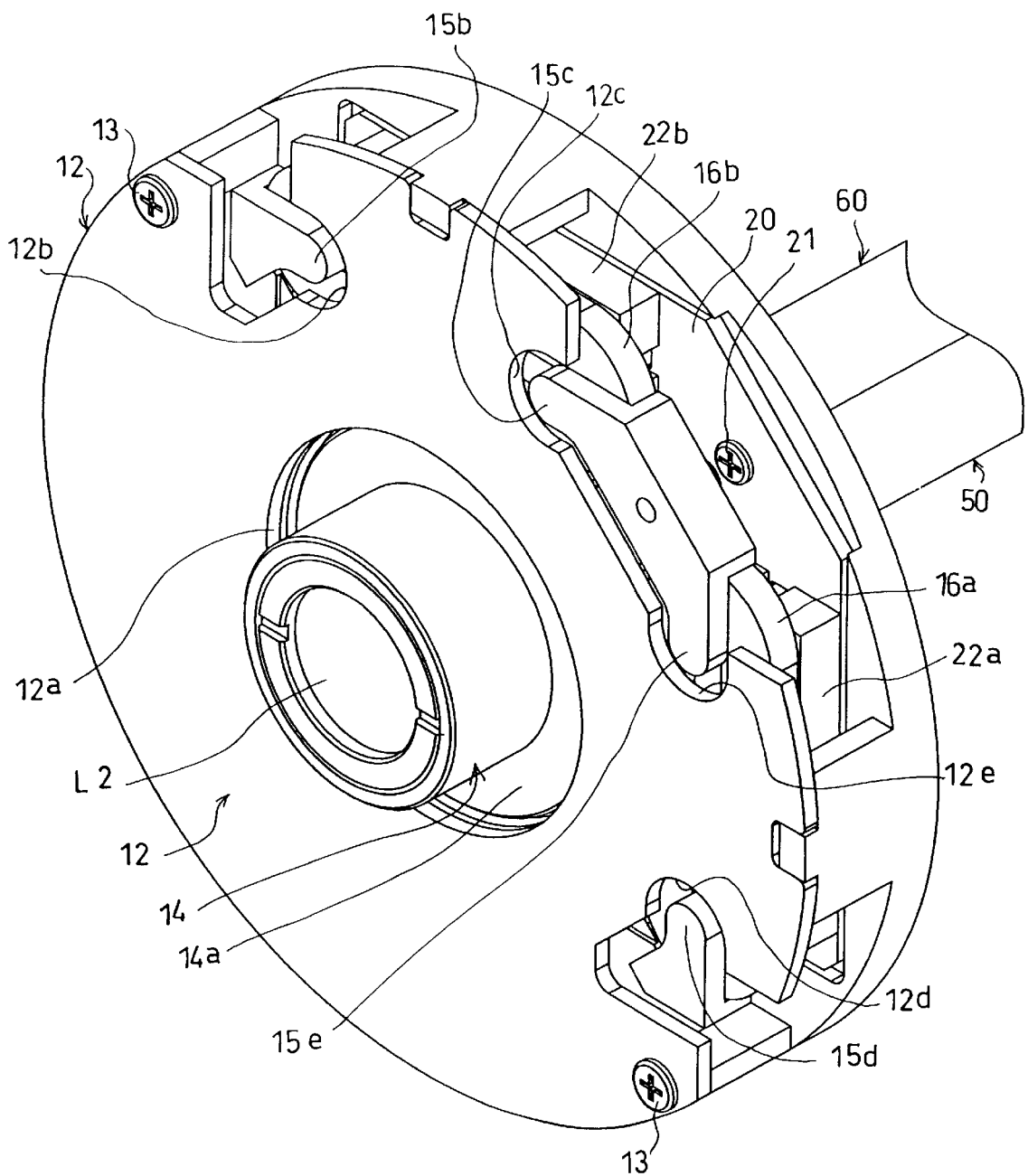
FIG. 3 is an enlarged perspective view of the image stabilizer unit shown in FIG. 2.

FIG. 1 shows an exploded perspective view of an embodiment of the image stabilizer unit 10, while FIGS. 2 and 3 each show a perspective view of the image stabilizer unit 10. The image stabilizer unit 10 is provided at the center thereof with the second lens group L2 and is formed as a unit in a substantially cylindrical shape with the axis of the image stabilizer unit 10 being coincident with the optical axis O of the photographic optical system. Two flexible printed wiring boards, i.e., a first flexible printed wiring board 50 and a second flexible printed wiring board 60 are connected to the image stabilizer unit 10 to extend rearwardly along the direction of the optical axis O. In this specification a flexible printed wiring board is hereinafter referred to as a flexible PWB.

The image stabilizer unit 10 is provided with a base (cylindrical base) 11. The base 11 is provided at the center thereof with a circular opening 11a (see FIG. 1) whose center coincides with the optical axis O. The image stabilizer unit 10 is provided with a yoke plate 12 which is secured to the front of the base 11 by a plurality of set screws 13. The image stabilizer unit 10 contains a drive mechanism for driving the second lens group L2 in a space between the base 11 and the yoke plate 12. A movable frame (a movable member) 15 which is driven by this drive mechanism is held between the base 11 and the yoke plate 12.

The second lens group L2 is supported by a lens frame 14. This lens frame 14 is secured to the movable frame 15 which is guided to be movable in a plane perpendicular to the optical axis O in the image stabilizer unit 10. The lens frame 14 is provided on an outer peripheral surface with a flange 14a (see FIG. 1) having a male thread around an outer peripheral surface thereof. This male thread is screw-engaged with a female thread formed on an inner peripheral surface of the circular central opening 15a of the movable frame 15 to secure the lens frame 14 to the movable frame 15.

A pair of coils, i.e., a first coil 16a (first electrical element) and a second coil 16b (second electrical element) are fixedly mounted on the movable frame 15. The first coil 16a is provided for exclusively driving the movable frame 15 in a horizontal direction (i.e., the X-direction shown in FIG. 2, perpendicular to the optical axis O) of the camera body. The first coil 16a is fixed to the movable frame 15 so that the longitudinal direction of the first coil 16a coincides with a vertical direction (i.e., the Y-direction perpendicular shown in FIG. 2, perpendicular to the X-direction) of the camera body. On the other hand, the second coil 16b is provided for exclusively driving the movable frame 15 in the vertical direction (i.e., the Y-direction) of the camera body. The second coil 16b is fixed to the movable frame 15 so that the longitudinal direction of the second coil 16b coincides with the horizontal direction (i.e., the X-direction) of the camera body.

One end (the lower end as viewed in FIG. 1) of the first coil 16a is held between the movable frame 15 and a first coil holding plate 17a secured to the movable frame 15 by a set screw 18a. Likewise, one end (the left end as viewed in FIG. 1) of the second coil 16b is held between the movable frame 15 and a second coil holding plate 17b secured to the movable frame 15 by a set screw 18b. The other ends of the first and second coils 16a and 16b which are positioned adjacent to each other are held by a common plate, i.e., a third coil holding plate 17c which is secured to the movable frame 15 by a set screw 18c.

The movable frame 15 is provided, at an end thereof on the opposite side of the central opening 15a from the first coil 16a, with a first LED (first electrical element) 19a which emits infrared rays used to detect the position of the movable frame 15 in the X-direction. The movable frame 15 is provided, at an end thereof on the opposite side of the central opening 15a from the second coil 16b, with a second LED (second electrical element) 19b which emits infrared rays used to detect the position of the movable frame 15 in the Y-direction. The first and second LEDs 19a and 19b are secured to the movable frame 15.

The movable frame 15 is formed integral with a pair of projections 15b and 15c positioned adjacent to the opposite ends of the second coil 16b in the longitudinal direction thereof, respectively. Each of the projections 15b and 15c extends forwardly in the direction of the optical axis by a predetermined length. Likewise, the movable frame 15 is formed integral with another pair of projections 15d and 15e positioned adjacent to the opposite ends of the first coil 16a in the longitudinal direction thereof, respectively. Each of the projections 15d and 15e extends forwardly in the direction of the optical axis by a predetermined length.

The movable frame 15 is provided with a pair of guide slots 15f which are positioned on the opposite side of the central opening 15a from the second coil 16b to be aligned in the X-direction. The image stabilizer unit 10 is provided therein with an L-shaped guide bar 24 positioned behind the movable frame 15. This L-shaped guide bar 24 is provided thereon with a first pair of guide rings 25 which are slidably fitted in the pair of guide slots 15f, respectively.

Figure 5:
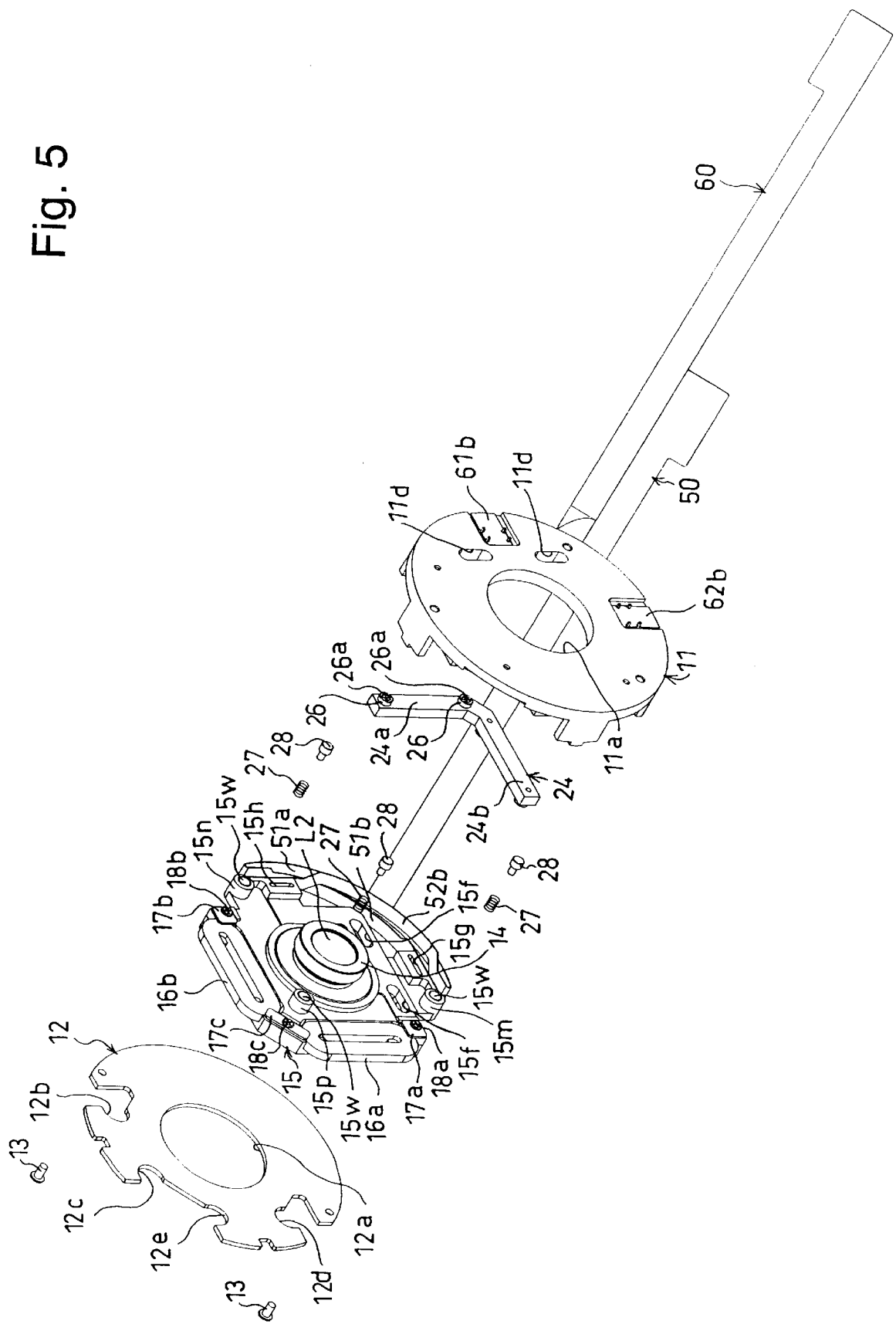
FIG. 5 is a partly exploded perspective view of the image stabilizer unit shown in FIG. 2, seen from a different angle.

The movable frame 15 is provided in the vicinity of the first, second and third coil holding plates 17a, 17b and 17c with hollow cylindrical portions 15m, 15n and 15p, respectively, each of which extends rearwardly in the direction of the optical axis O (see FIG. 5). Each of the three cylindrical portions 15m, 15n and 15p, which are positioned around the optical axis O, is closed at the bottom thereof (i.e., the front end thereof) but is open at the rear end thereof (i.e., the end thereof which faces the base 11) to form a guide hole 15w. In the guide hole 15w of each cylindrical portions 15m, 15n and 15p, a compression spring (coil spring) 27 and a slidable pin 28 are inserted in this order.

Figure 4:
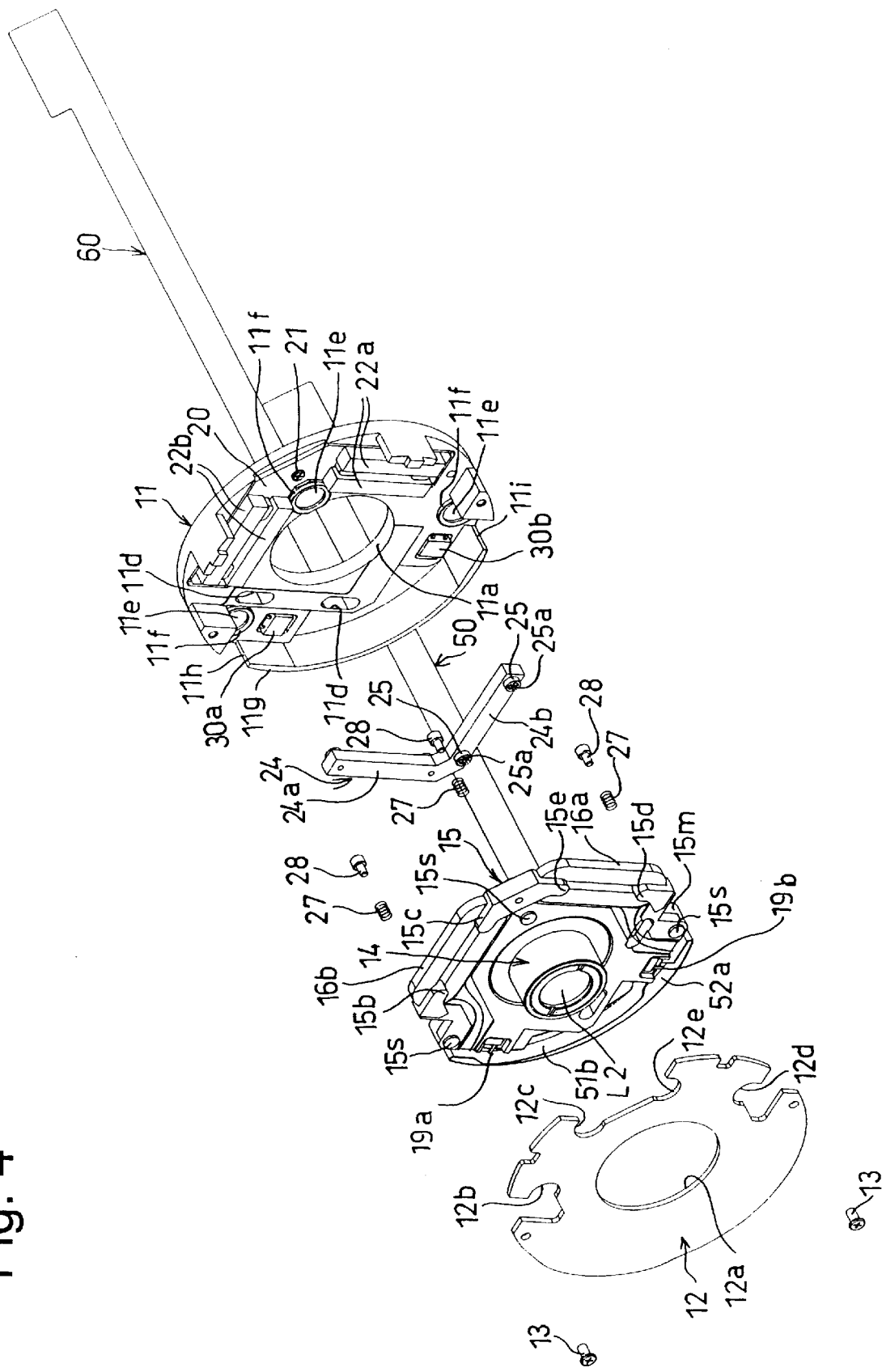
FIG. 4 is a partly exploded perspective view of the image stabilizer unit shown in FIG. 2.

Each slidable pin 28 is always biased rearwardly in the direction of the optical axis O by the corresponding compression spring 27 to be always pressed against a corresponding plane circular surface 11e formed on the base 11 (see FIG. 4). Each compression spring 27, which brings the corresponding slidable pin 28 into pressing contact with the corresponding circular surface 11e, has a spring force which is predetermined so as to have a minimum influence on the movement of the movable frame 15 in a plane perpendicular to the optical axis O. The position of the movable frame 15 with respect to the base 11 in the direction of the optical axis O is fixed by the pressing contact of each slidable pin 28 against the corresponding circular surface 11e.

The movable frame 15 is provided on a surface thereof facing the yoke plate 12 with three protuberances 15s which are formed to correspond to the three cylindrical portions 15m, 15n and 15p in the direction of the optical axis O, respectively. Each protuberance 15s bulges towards the yoke plate 12. The end faces of the three protuberances 15s which face the yoke plate 12 lie in a common plane extending perpendicular to the optical axis O. The movable frame 15 moves in a plane perpendicular to the optical axis O while only the end faces of the three protuberances 15s of the front face of the movable frame 15 are in sliding contact with the yoke plate 12. This structure is effective to reduce the frictional force generated between the movable frame 15 and the yoke plate 12 when the movable frame 15 is driven.

The image stabilizer unit 10 is provided therein with an L-shaped yoke plate 20. This L-shaped yoke plate 20 is fixed by three set screws 21 to a corresponding L-shaped plane surface 11b (see FIG. 1) formed on the inner surface of the base 11 which faces the movable frame 15. The shape of the L-shaped surface 11b corresponds to the shape of the L-shaped yoke plate 20. The L-shaped yoke plate 20 is provided with four holes 20c, while the base 11 is provided on the L-shaped surface 11b with corresponding four projections 11c which are respectively fitted in the four holes 20c to thereby determine the fixed position of the L-shaped yoke plate 20 onto the L-shaped surface 11b. The L-shaped yoke plate 20 is provided with a first yoke portion 20a extending in the Y-direction and a second yoke portion 20b extending in the X-direction.

A first pair of permanent magnet bars 22a are fixed on the front face of the first yoke portion 20a so that the two projections 11c which respectively extend through the two holes 20c formed on the first yoke portion 20a are held between the first pair of permanent magnet bars 22a. Likewise, a second pair of permanent magnet bars 22b is fixed to the front face of the second yoke portion 20b so that the two projections 11c which respectively extend through the two holes 20c formed on the second yoke portion 20b are held between the second pair of permanent magnet bars 22b. The first pair of permanent magnet bars 22a and the second pair of permanent magnet bars 22b face the first coil 16a and the second coil 16b in the direction of the optical axis O, respectively. The first pair of permanent magnet bars 22a and the first coil 16a together constitute a first electromagnetic drive while the second pair of permanent magnet bars 22b and the second coil 16b together constitute a second electromagnetic drive.

The base 11 is provided, on the opposite side of the central opening 11a from the first yoke portion 20a of the L-shaped yoke plate 20, with a pair of guide slots 11d which are aligned in the Y-direction. The L-shaped guide bar 24 is provided thereon with a second pair of guide rings 26 which are slidably fitted into the pair of guide slots 11d, respectively.

The base 11 is provided, at a position thereon facing the first LED 19a in the direction of the optical axis O, with a first PSD (one-dimensional semiconductor position sensitive device/first electrical element) 30a used to detect the position of the movable frame 15 in the X-direction on. The first PSD 30a is secured to the base 11. Infrared rays emitted from the first LED 19a passes through a first slit 15h (see FIG. 5) to enter the first PSD 30a. The first slit 15h is formed on the movable frame 15 to extend in the Y-direction. The first LED 19a and the first PSD 30a are fundamental elements of a first position detector for detecting the variation in position of the movable frame 15 relative to the base 11 in the X-direction (first direction).

The base 11 is provided, at a position thereon facing the second LED 19b in the direction of the optical axis O, with a second PSD (one-dimensional semiconductor position sensitive device/second electrical element) 30b used to detect the position of the movable frame 15 in the Y-direction on. The second PSD 30b is secured to the base 11. Infrared rays emitted from the second LED 19b passes through a second slit 15g (see FIG. 5) to enter the second PSD 30b. The second slit 15g is formed on the movable frame 15 to extend in the X-direction. The second LED 19b and the second PSD 30b are fundamental elements of a second position detector for detecting the variation in position of the movable frame 15 relative to the base 11 in the Y-direction (second direction).

In the image stabilizer unit 10, the first electromagnetic drive (the first pair of permanent magnet bars 22a and the first coil 16a) and the first position detector (the first LED 19a and the first PSD 30a) together constitute a first drive device which drives the movable frame 15 in the X-direction. Similarly, the second electromagnetic drive (the second pair of permanent magnet bars 22b and the second coil 16b) and the second position detector (the second LED 19b and the second PSD 30b) together constitute a second drive device which drives the movable frame 15 in the Y-direction.

The base 11 is provided on the front surface thereof with three ring-shaped protuberances 11f each of which defines the corresponding circular surface 11e thereinside. Each of the three slidable pins 28 is always pressed against the corresponding circular surface 11e by the corresponding compression spring 27. Each circular surface 11e has a predetermined area which substantially corresponds to the maximum range of movement of the corresponding slidable pin 28, which moves together with the movement of the movable frame 15. The movable frame 15 moves in a plane perpendicular to the optical axis O relative to the base 11, while only the tips of the three slidable pins 28 connected to the movable frame 15 are in sliding contact with the three circular surfaces lie, respectively. This structure is effective to reduce the frictional force generated between the movable frame 15 and the base 11 when the movable frame 15 is driven.

The image stabilizer unit 10 is provided, between the base 11 and the movable frame 15 on the opposite side of the circular opening 11a with respect to the L-shaped yoke plate 20, with the aforementioned L-shaped guide bar 24. This L-shaped guide bar 24 is provided with a first guide arm 24a extending in the Y-direction and a second guide arm 24b extending in the X-direction. The aforementioned second pair of guide rings 26 are fixed by two set screws 26a on a surface of the first guide arm 24a which faces the base 11, while the aforementioned first pair of guide rings 25 are fixed by two set screws 25a on a surface of the second guide arm 24b which faces the movable frame 15.

As described above, the first pair of guide rings 25 are slidably fitted into the pair of guide slots 15f, respectively, while the second pair of guide rings 26 are slidably fitted into the pair of guide slots 11d, respectively. Therefore, the movable frame 15 is guided in the X-direction by the L-shaped guide bar 24, the first pair of guide rings 25 and the pair of guide slots 15f and at the same time in the Y-direction by the L-shaped guide bar 24, the second pair of guide rings 26 and the pair of guide slots 11d, so as to be movable with respect to the base 11.

The yoke plate 12 is provided at an approximate center thereof with a circular opening 12a through which the front surface of the second lens group L2 is exposed to the outside of the image stabilizer unit 10. The yoke plate 12 is provided with four cut-away portions 12b, 12c, 12d and 12e which are formed to correspond to the four projections 15b, 15c, 15d and 15e formed on the movable barrel 15, respectively. Each of the four cut-away portions 12b, 12c, 12d and 12e is formed to have a size corresponding to the maximum range of movement of the corresponding projection 15b, 15c, 15d or 15e so that the inner edge of each of the cut-away portions 12b, 12c, 12d and 12e functions as a limit stop against which the corresponding projection 15b, 15c, 15d or 15e abuts at the time the movable frame 15 moves to a movable limit position thereof relative to the base 11. Accordingly, the maximum range of movement of the movable frame 15 in each of the X-direction and the Y-direction is defined by the combination of the four projections 15b, 15c, 15d and 15e and the four cut-away portions 12b, 12c, 12d and 12, respectively.

The first flexible PWB 50 having eight conductors (lines) in total is connected to the image stabilizer unit 10. One end and the other end of the first flexible PWB 50 are connected to the image stabilizer unit 10 and the control circuit 8, respectively.

Figure 14:
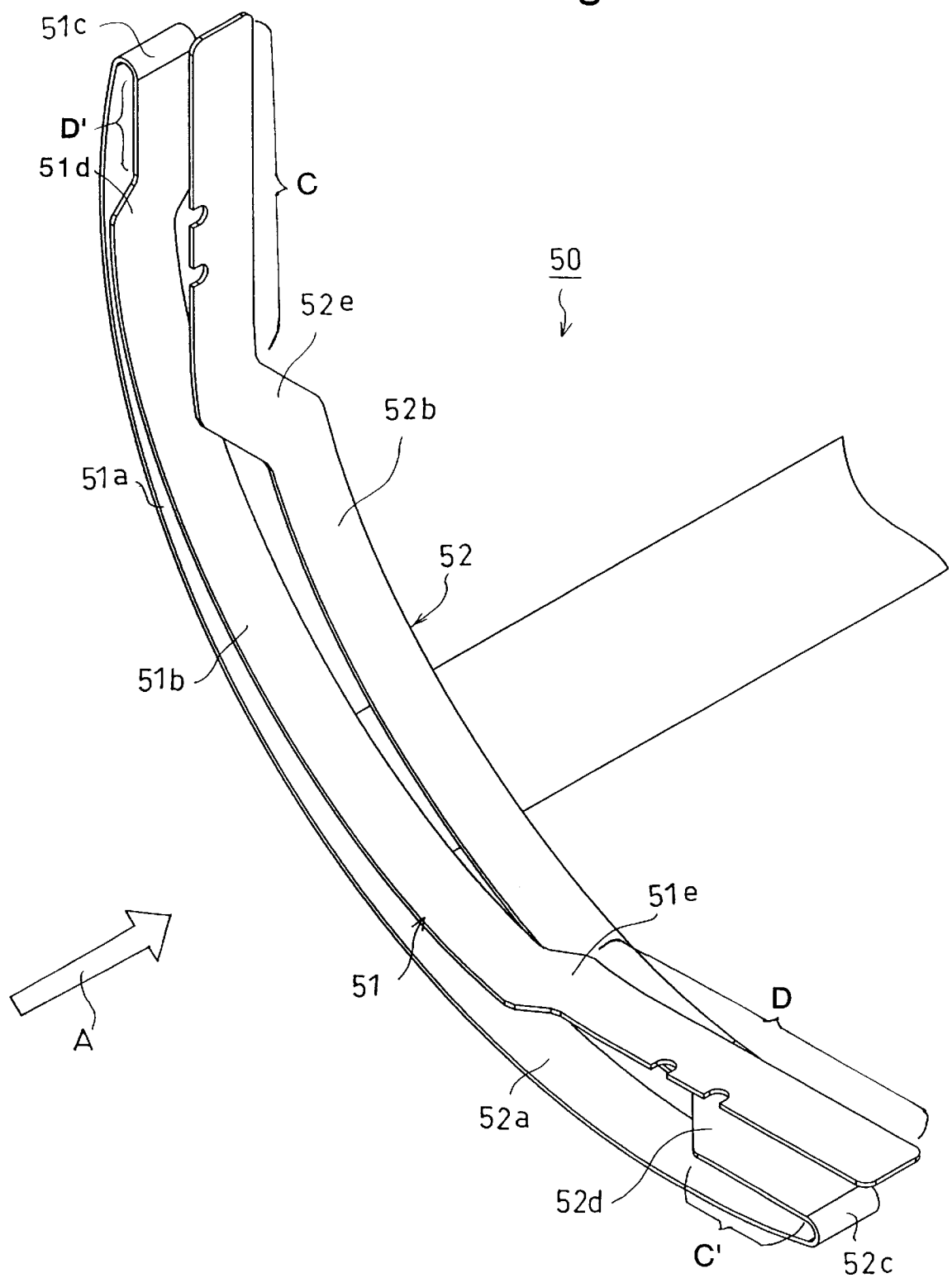
FIG. 14 is an enlarged perspective view of part of a flexible printed wiring board connected to the image stabilizer unit shown in FIG. 2.

One end (front end) of the first flexible PWB 50 which is connected to the image stabilizer unit 10 is bifurcated to provide two wiring strips, i.e., a first wiring strip 52 and a second wiring strip 51 (see FIG. 14). The first wiring strip 52 is provided therein with four conductors (not shown); two of the four conductors are used for the second coil 16b and the remaining two conductors are used for the first LED 19a. Likewise, the second wiring strip 51 is provided therein with four conductors (not shown); two of the four conductors are used for the first coil 16a and the remaining two conductors are used for the second LED 19b. As can be seen in FIG. 14, the first and second wiring strips 52 and 51 firstly extend in opposite directions substantially perpendicular to the longitudinal direction of the first flexible PWB 50 to be separate from each other along the circumferential direction of the base 11 about the optical axis O, and subsequently are folded back inwardly towards each folded portion of each respective second and first wiring strips (i.e., towards the optical axis O).

As shown in FIGS. 6 through 11, an arc-shaped peripheral wall 11g is formed integral with the base 11 along a circumferential portion thereof. The first wiring strip 52 includes an outer strip portion 52a and an inner strip portion 52b. The outer strip portion 52a is positioned along the outer peripheral surface of the peripheral wall 11g. Part of the first wiring strip 52 is folded back inwardly along one circumferential end 11i of the peripheral wall 11g so that the inner strip portion 52b is positioned inside the image stabilizer unit 10. Likewise, the second wiring strip 51 includes an outer strip portion 51a and an inner strip portion 51b. The outer strip portion 51a is positioned along the outer peripheral surface of the peripheral wall 11g. Part of the second wiring strip 51 is folded back inwardly along the other circumferential end 11h of the peripheral wall 11g so that the inner strip portion 51b is positioned inside the image stabilizer unit 10. The inner strip portions 51b and 52b, which are positioned inside the image stabilizer unit 10, are curved so as to bend towards the peripheral wall 11g and are positioned in a wiring strip accommodating space "S" formed between the peripheral wall 11g and the movable frame 15.

The first LED 19a is mounted on the inner strip portion 52b of the first wiring strip 52 so that the two legs of the first LED 19a are respectively soldered to two conductors of the first wiring strip 52, while the ends of two lead wires (i.e., the opposite ends of turns of wire of the second coil 16b) 53 which extend from the second coil 16b are soldered to the remaining two conductors of the first wiring strip 52. Similarly, the second LED 19b is mounted on the inner strip portion 51b of the second wiring strip 51 so that the two legs of the second LED 19b are respectively soldered to two conductors of the second wiring strip 51, while the ends of two lead wires (i.e., the opposite ends of turns of wire of the first coil 16a) 54 which extend from the first coil 16a are soldered to the remaining two conductors of the second wiring strip 51.

As shown in FIG. 14, the inner strip portion 52b of the first wiring strip 52 is provided, in the vicinity of a folded portion 52c (see FIG. 9) formed between the outer and inner strip portions 52a and 52b, with a first S-curved (S-shaped) portion 52d which is curved to bulge rearwardly in the direction of the optical axis O so as to lie along side (sidestep) the inner strip portion 51b of the second wiring strip 51 in the direction of the optical axis O. The inner strip portion 52b of the first wiring strip 52 is further provided, in the vicinity of the part thereof to which the first LED 19a is fixed, with a second S-curved (S-shaped) portion 52e which is curved to bulge forwardly in the direction of the optical axis O.

Likewise, the inner strip portion 51b of the second wiring strip 51 is provided, in the vicinity of a folded portion 51c formed between the outer and inner strip portions 51a and 51b, with a first S-curved portion 511d which is curved to bulge forwardly in the direction of the optical axis O so as to lie along side (sidestep) the inner strip portion 52b of the first wiring strip 52 in the direction of the optical axis O. The inner strip portion 51b of the second wiring strip 51 is further provided, in the vicinity of the portion thereof to which the second LED 19b is fixed, with a second S-curved portion 51e which is curved to bulge rearwardly in the direction of the optical axis O.

The first and second S-curved portions 52d, 52e are formed so that both 'ends' of the inner strip portion 52b (shown as "C", "C'" in FIG. 14) are in substantially same position in the direction of the optical axis O. Likewise, the first and second S-curved portions 51d, 51e are formed so that both 'ends' of the inner strip portion 51b (shown as "D", "D'" in FIG. 14) are in substantially same position in the direction of the optical axis O. Further, the end portions "C" and "C'" of the inner strip portion 52b are in substantially same position in direction of the optical axis O with respect to the end portions "D'" and "D" of the inner strip portion 51b. In other words, the inner strip portion 52b and the inner strip portion 51b overlap each other in the radial direction of the base 11 except for the intersecting portions (the portions between the S-curved portion 52d or 51d and the S-curved portion 52e or 51e) thereof.

Figure 12:
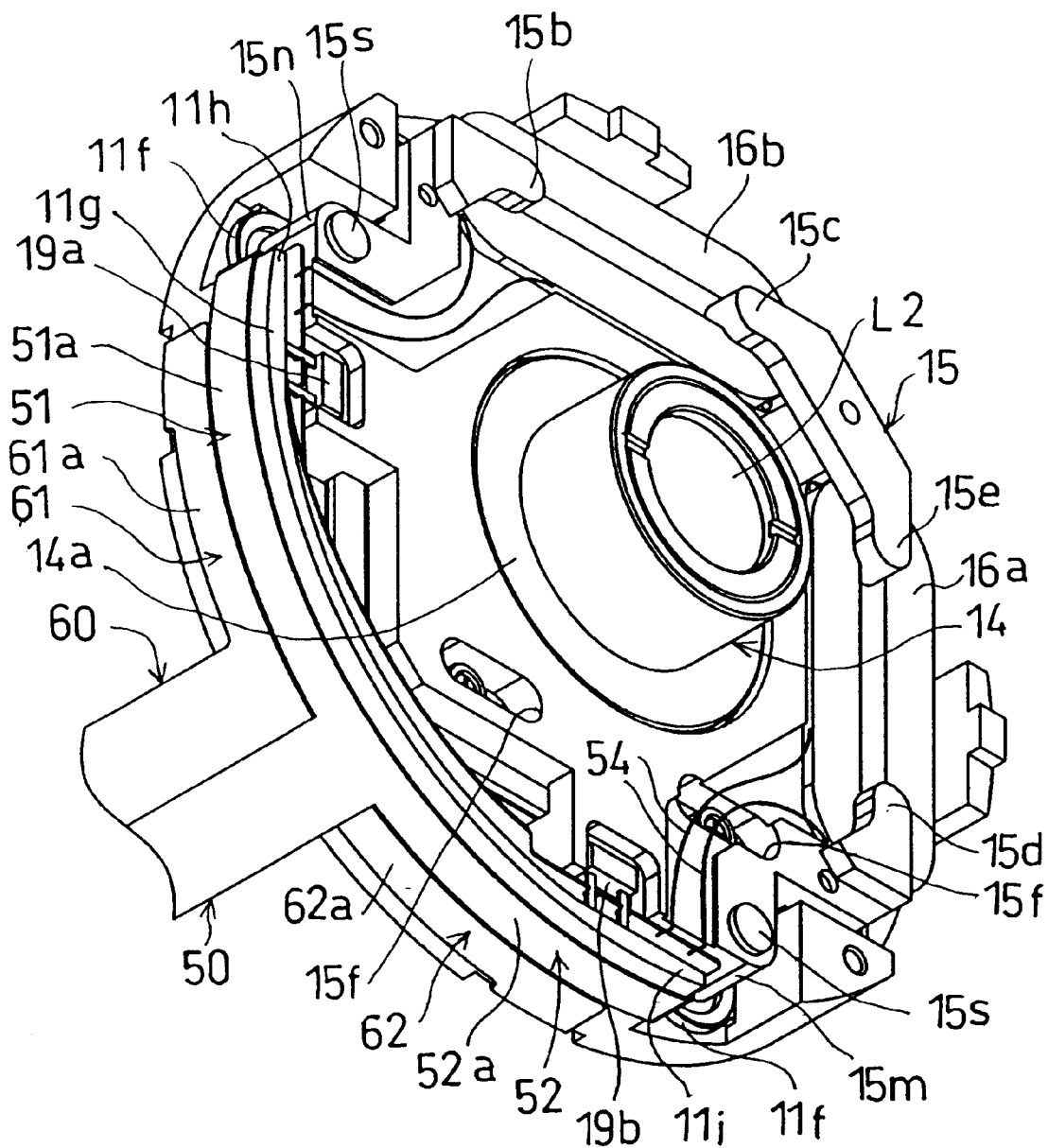
FIG. 12 is a perspective view of inner parts of the image stabilizer unit shown in FIG. 6.
Figure 13:
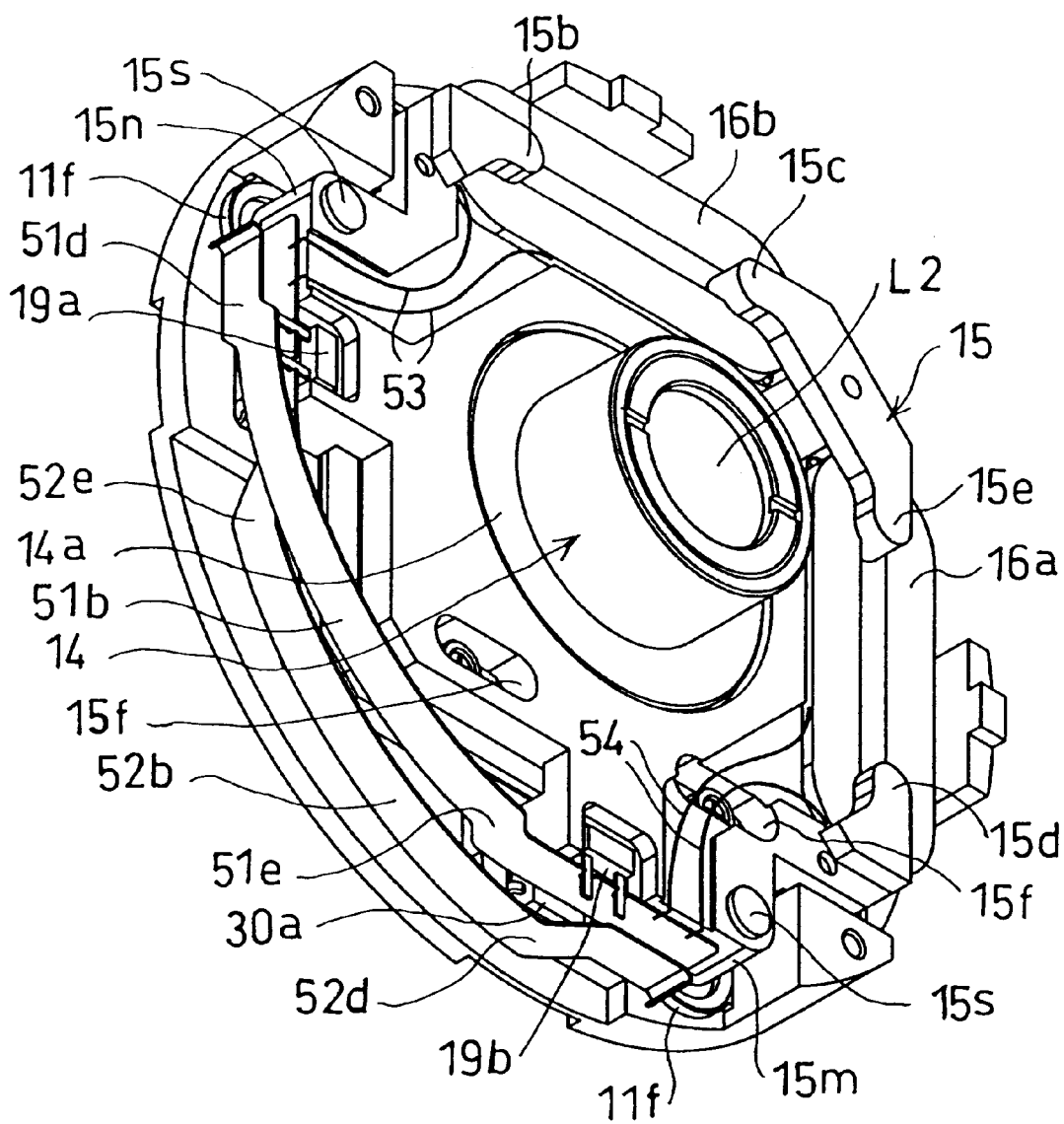
FIG. 13 is a perspective view, with some parts omitted therefrom, of the inner parts of the image stabilizer unit shown in FIG. 12.

The inner strip portion 52b of the first wiring strip 52 and the inner strip portion 51b of the first wiring strip 51 intersect each other in the wiring strip accommodating space "S" as viewed from the front of the image stabilizer unit 10 in the direction of the optical axis O, e.g., as viewed in the direction shown by an arrow "A" in FIG. 14. In each of FIGS. 6, 7 and 8, the intersecting portion is designated by an arrow "B". FIG. 12 is a perspective view of inner parts of the image stabilizer unit 10 with the yoke plate 12 removed, seen from an angle. FIG. 13 is a perspective view of inner parts of the image stabilizer unit 10, seen from the same angle as in FIG. 12, wherein the second flexible PWB 60, the arc-shaped peripheral wall 11g, and the portions of the first flexible PWB other than the inner strip portions 51b and 52b are removed for the purpose of illustration so that the intersecting portion between the inner strip portions 51b and 52b can be easily seen.

As can be understood from the drawings, although the inner strip portion 52b of the first wiring strip 52 intersects the inner strip portion 51b of the second wiring strip 51 as viewed from the front of the image stabilizer unit 10 in the direction of the optical axis O, since the inner strip portion 51b and the inner strip portion 52b are provided with the first S-curved portion 51d and the first S-curved portion 52d, respectively, in order for the inner strip portion 52b and the inner strip portion 51b to sidestep each other in the direction of the optical axis O, the space in the image stabilizer unit 10 that is necessary for positioning the inner strip portion 51b and the inner strip portion 52b in the image stabilizer unit 10 is made smaller, especially in the direction of the optical axis O, than the case where the inner strip portion 51b and the inner strip portion 52b are not provided with the first S-curved portion 51d and the first S-curved portion 52d, respectively. This makes it possible to design the image stabilizer unit 10 small and compact.

Furthermore, with the second S-curved portions 5le and 52e formed on the inner strip portions 51b and 52b, respectively, the space in the image stabilizer unit 10 that is necessary for positioning the inner strip portion 51b and the inner strip portion 52b in the image stabilizer unit 10 is successfully made much smaller.

The second flexible PWB 60 having eight conductors (lines) in total is connected to the image stabilizer unit 10 to be positioned adjacent to the first flexible PWB 50. One end and the other end of the second flexible PWB 60 are connected to the image stabilizer unit 10 and the control circuit 8, respectively.

One end (front end) of the second flexible PWB 60 which is connected to the image stabilizer unit 10 is bifurcated to provide two wiring strips: a first wiring strip 61 and a second wiring strip 62 (see FIG. 1). The first wiring strip 61 is provided therein with four conductors (not shown) used for the first PSD 30a. Likewise, the second wiring strip 62 is provided therein with four conductors used for the second PSD 30b. As can be seen in FIG. 1, he first and second wiring strips 61 and 62 extend in opposite directions substantially perpendicular to the longitudinal direction of the second flexible PWB 60 to be separate from each other.

The first wiring strip 61 is provided with a circumferential strip portion 61a and a connecting end portion 61b. The circumferential strip portion 61a is positioned along the outer peripheral surface of the arc-shaped peripheral wall 11g. The connecting end portion 61b is bent inwardly from the plane of the circumferential strip portion 61a against a rear surface of the base 11 wherein the legs of the first PSD 30a are soldered onto the connecting end portion 61b. Similarly, the second wiring strip 62 is provided with a circumferential strip portion 62a and a connecting end portion 62b. The circumferential strip portion 62a is positioned along the outer peripheral surface of the arc-shaped peripheral wall 11g. The connecting end portion 62b is bent inwardly from the plane of the circumferential strip portion 62a against a rear surface of the base 11 wherein the legs of the second PSD 30b are soldered onto the connecting end portion 62b.

Figure 16:
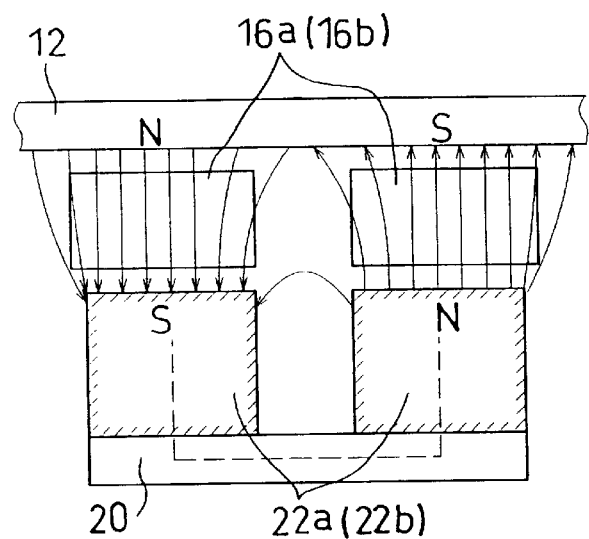
FIG. 16 is an explanatory view of an electromagnetic drive of the image stabilizer unit, showing the principle of driving of the image-stabilizing optical system.
Figure 17:
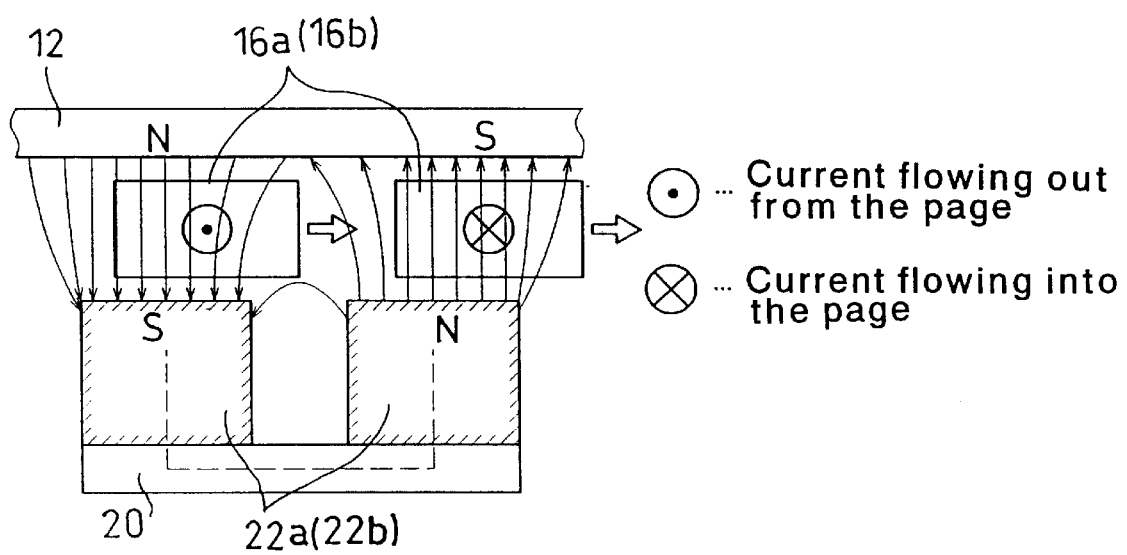
FIG. 17 is an explanatory view of the electromagnetic drive of the image stabilizer unit, showing the principle of driving of the image-stabilizing optical system.
Figure 18:
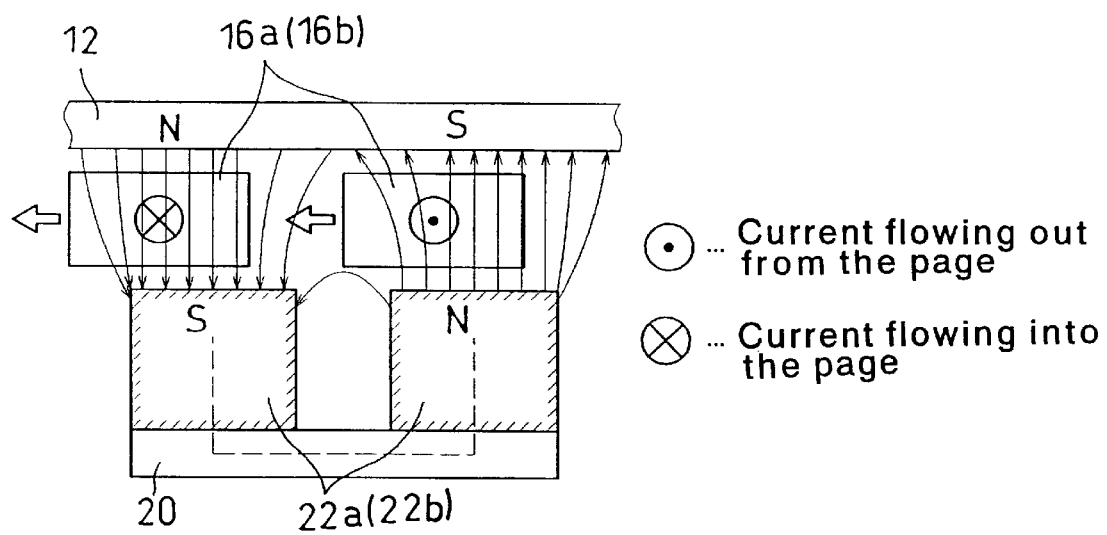
FIG. 18 is an explanatory view of the electromagnetic drive of the image stabilizer unit, showing the principle of driving of the image-stabilizing optical system.

FIGS. 16, 17 and 18 are explanatory views of each of the aforementioned first and second electromagnetic drives of the image stabilizer unit 10, showing the principle of driving of the image-stabilizing optical system, i.e., the second lens group L2. FIG. 16 shows a state where the first coil 16a (or the second coil 16b) is in a neutral position thereof, wherein no current is supplied to the first coil 16a (or the second coil 16b). FIG. 17 shows a state where current is supplied to the first coil 16a (or the second coil 16b) in one direction therethrough. FIG. 18 shows a state where current is supplied to the first coil 16a (or the second coil 16b) in the other direction therethrough. As can be seen from these drawings, each of the first coil 16a and the second coil 16b can be driven in each of the two opposite directions in a plane perpendicular to the optical axis O by changing the direction of flow of current supplied to each of the first coil 16a and the second coil 16b. This makes it possible to drive the movable frame 15.

Figure 6:
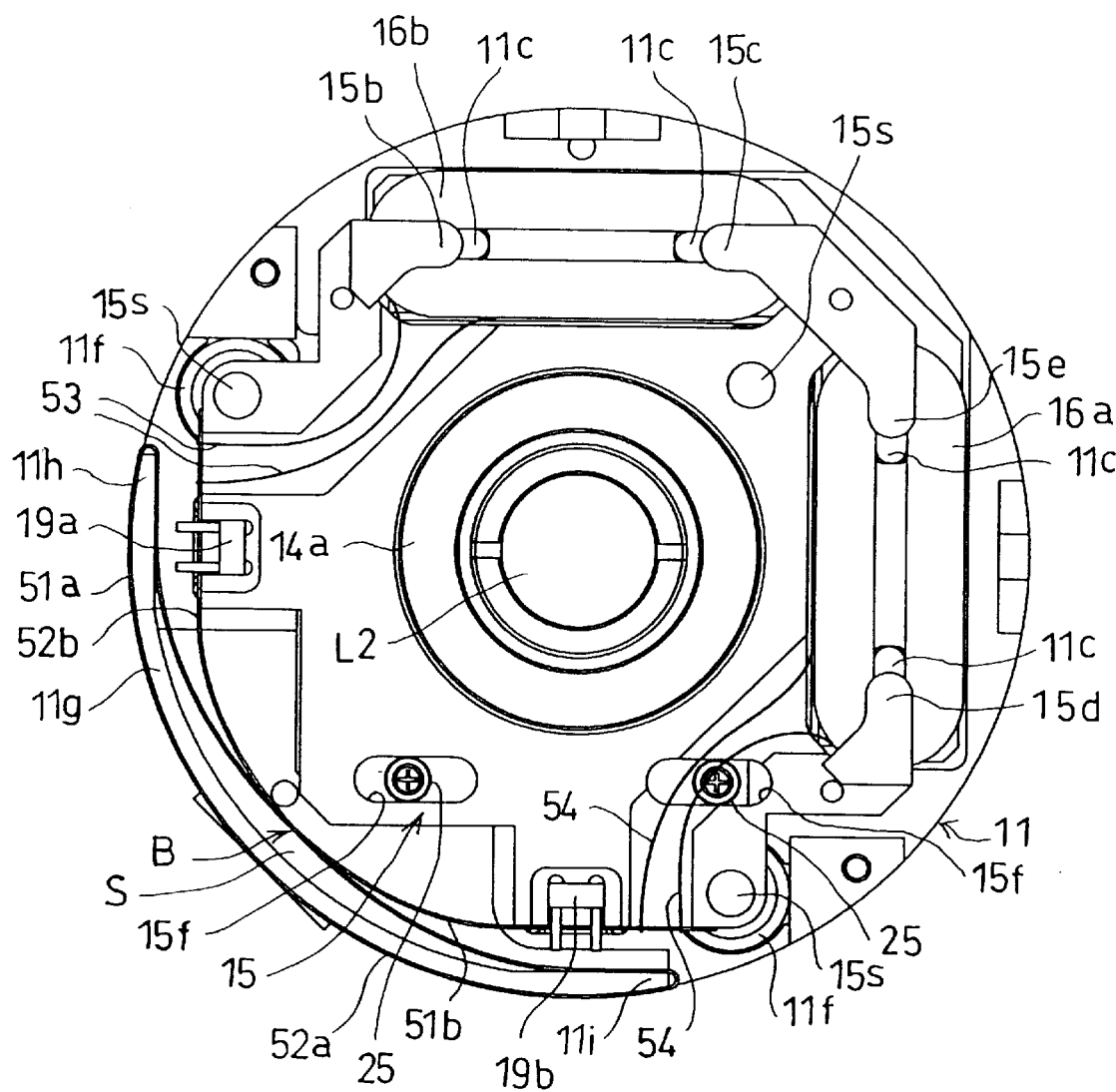
FIG. 6 is a front view of an inner portion of the image stabilizer unit shown in FIG. 2, in a state where a movable frame in the image stabilizer unit is in a neutral position thereof.
Figure 7:
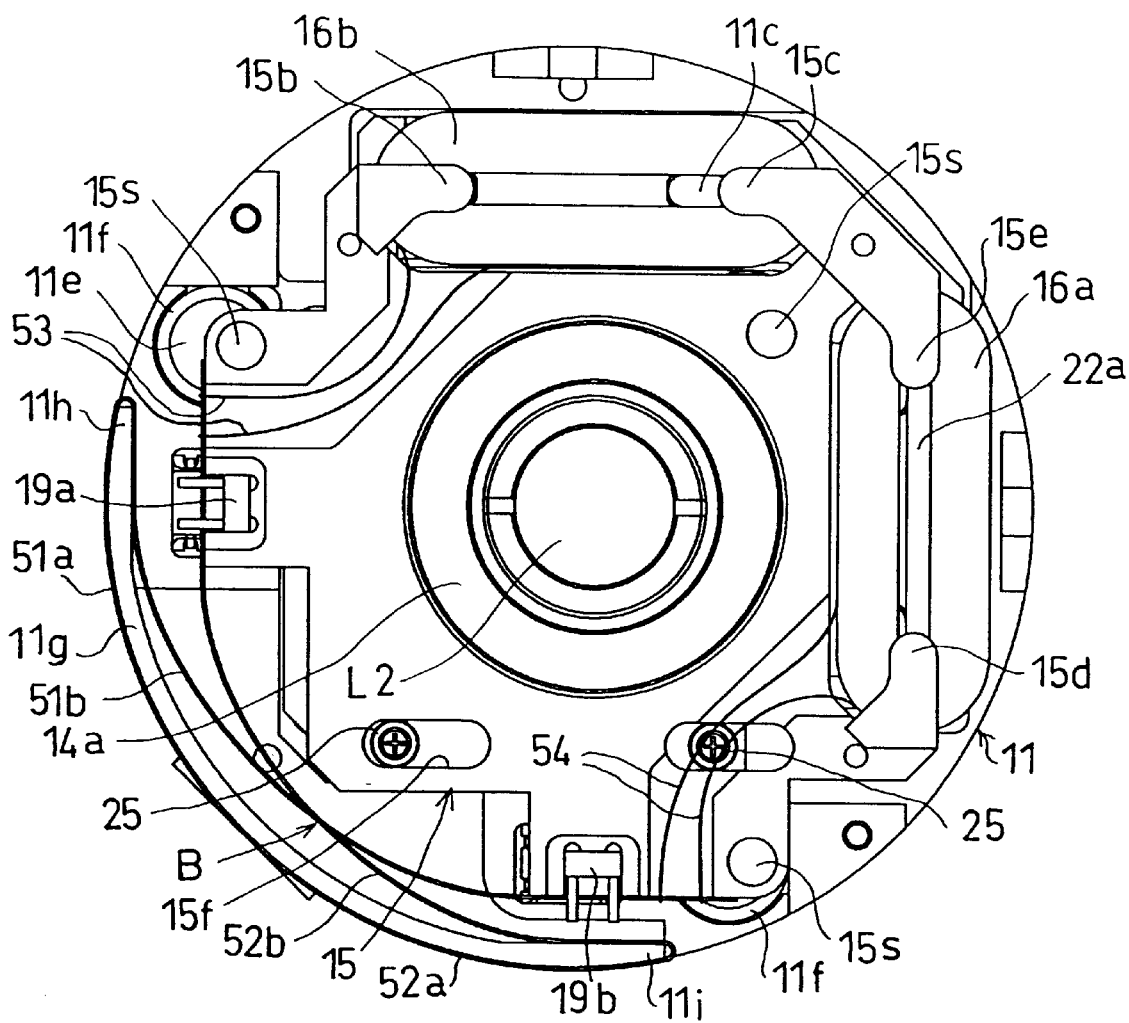
FIG. 7 is a front view of the inner portion of the image stabilizer unit shown in FIG. 2, in a state where the movable frame in the image stabilizer unit is in a movable limit position for compensation along the X-axis direction shown in FIG. 2.
Figure 8:
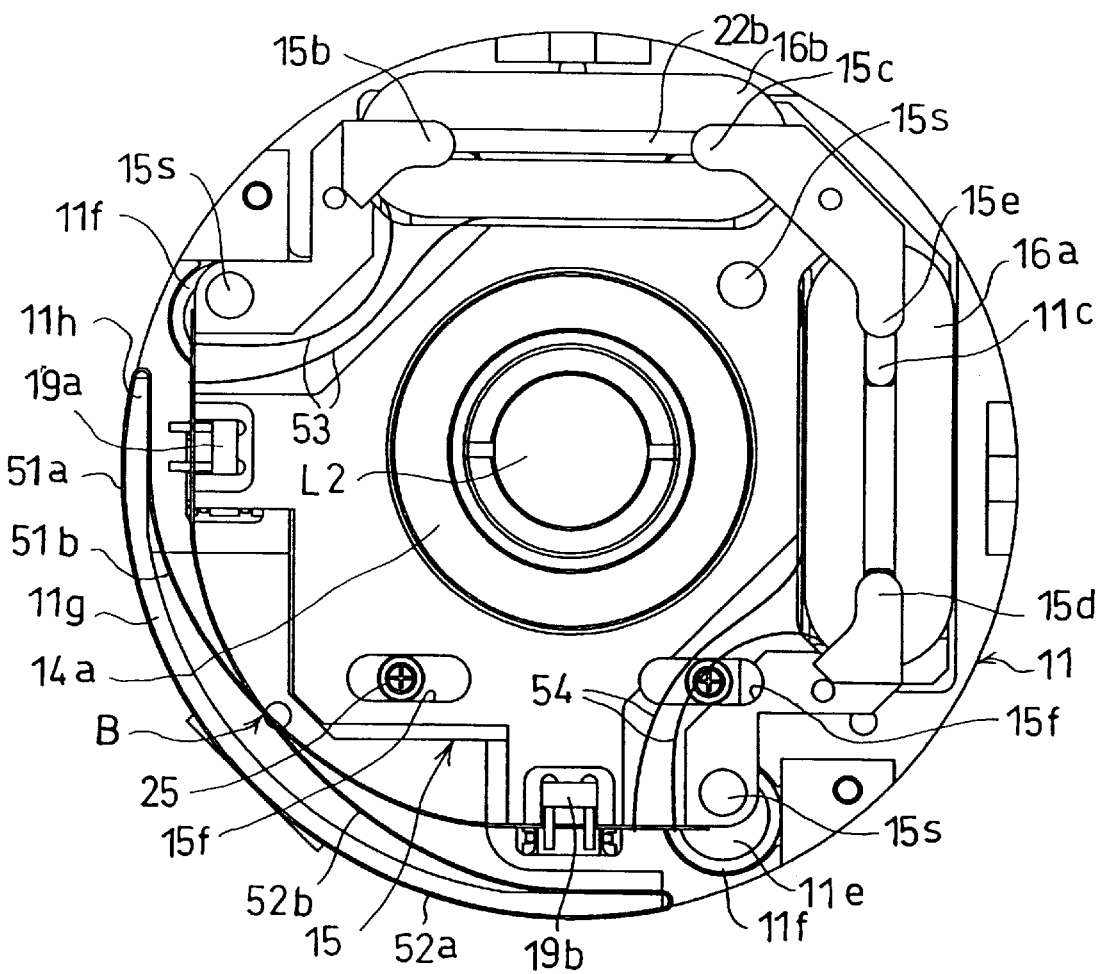
FIG. 8 is a front view of the inner portion of the image stabilizer unit shown in FIG. 2, in a state where the movable frame in the image stabilizer unit is in a movable limit position for compensation along the Y-axis direction shown in FIG. 2.
Figure 9:
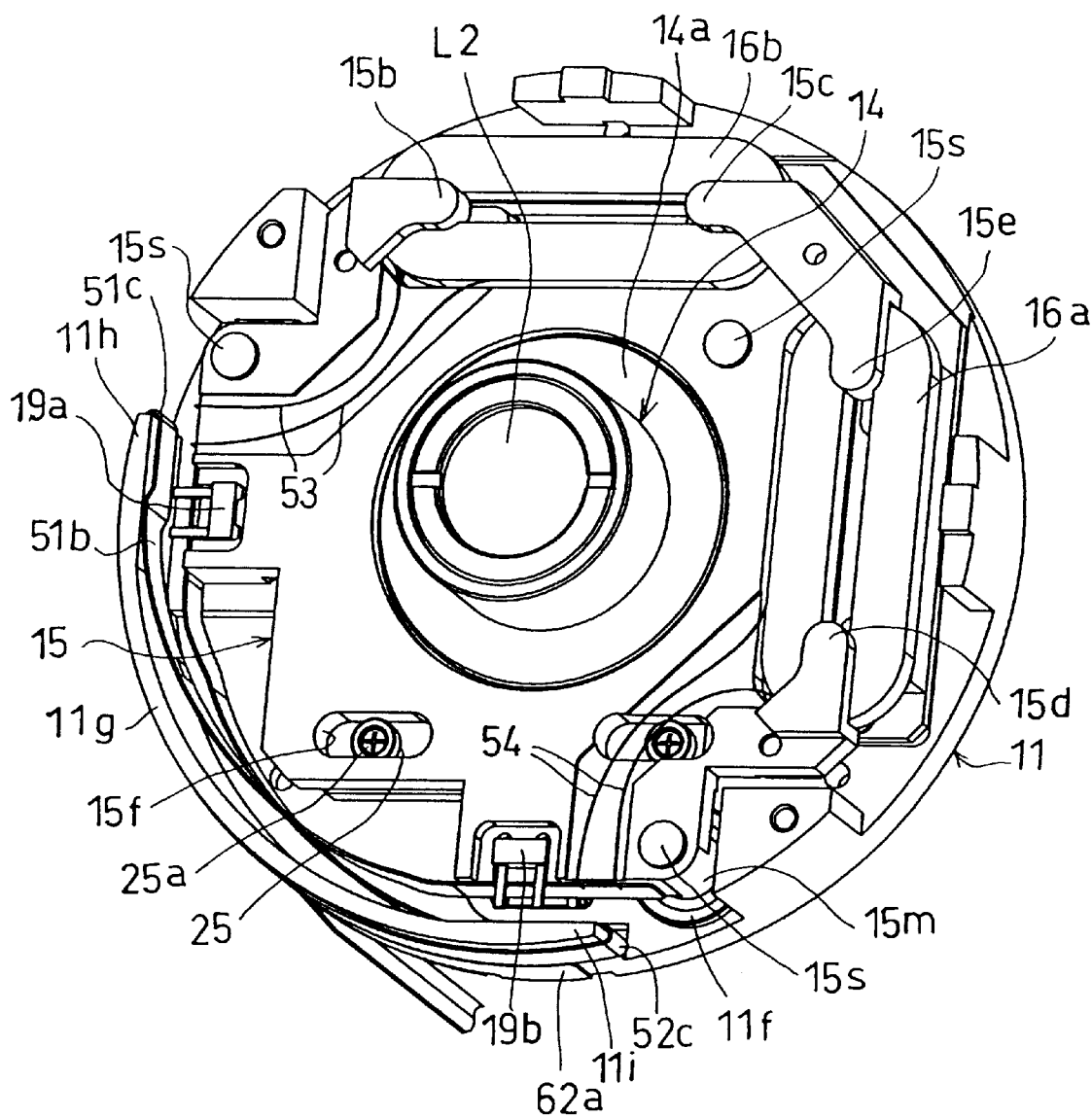
FIG. 9 is a perspective view of the inner portion of the image stabilizer unit shown in FIG. 6.
Figure 10:
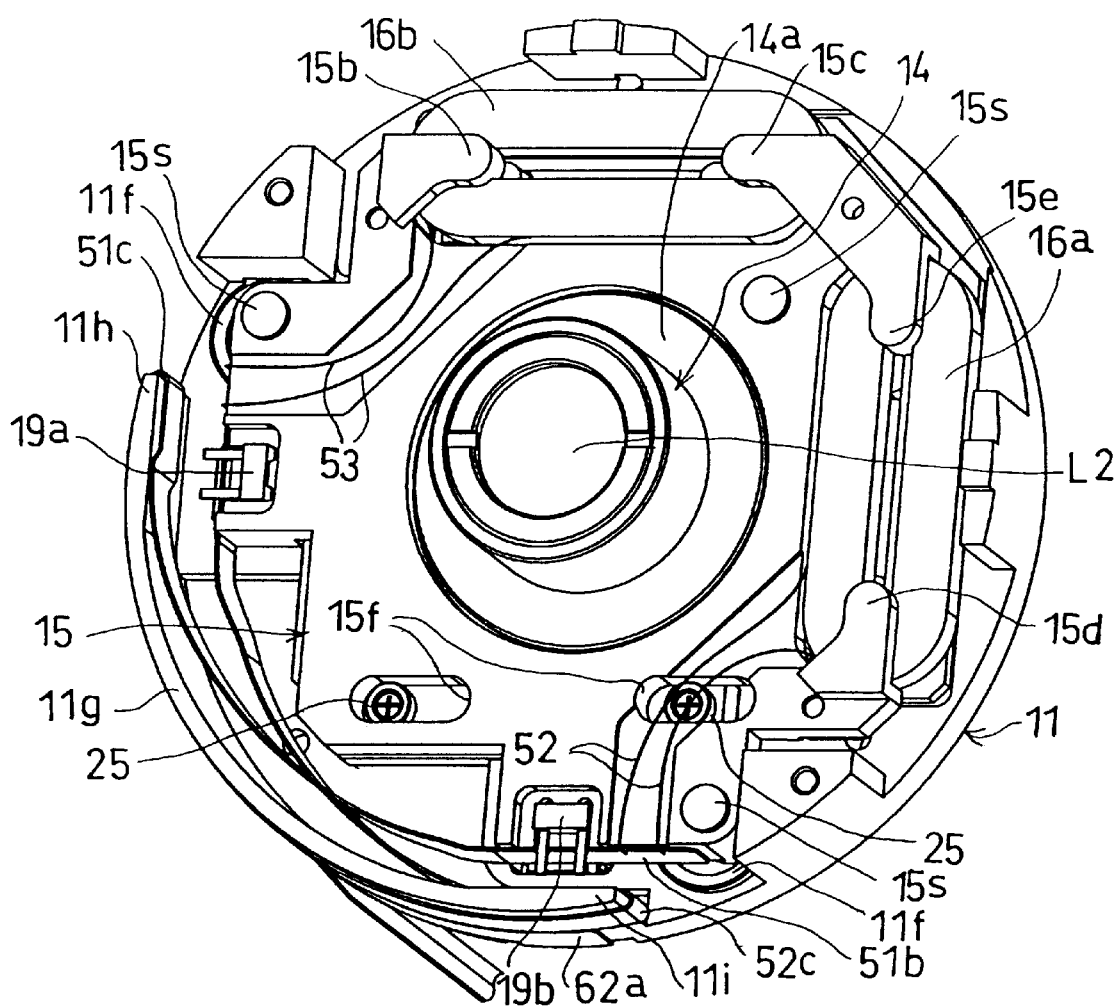
FIG. 10 is a perspective view of the inner portion of the image stabilizer unit shown in FIG. 7.
Figure 11:
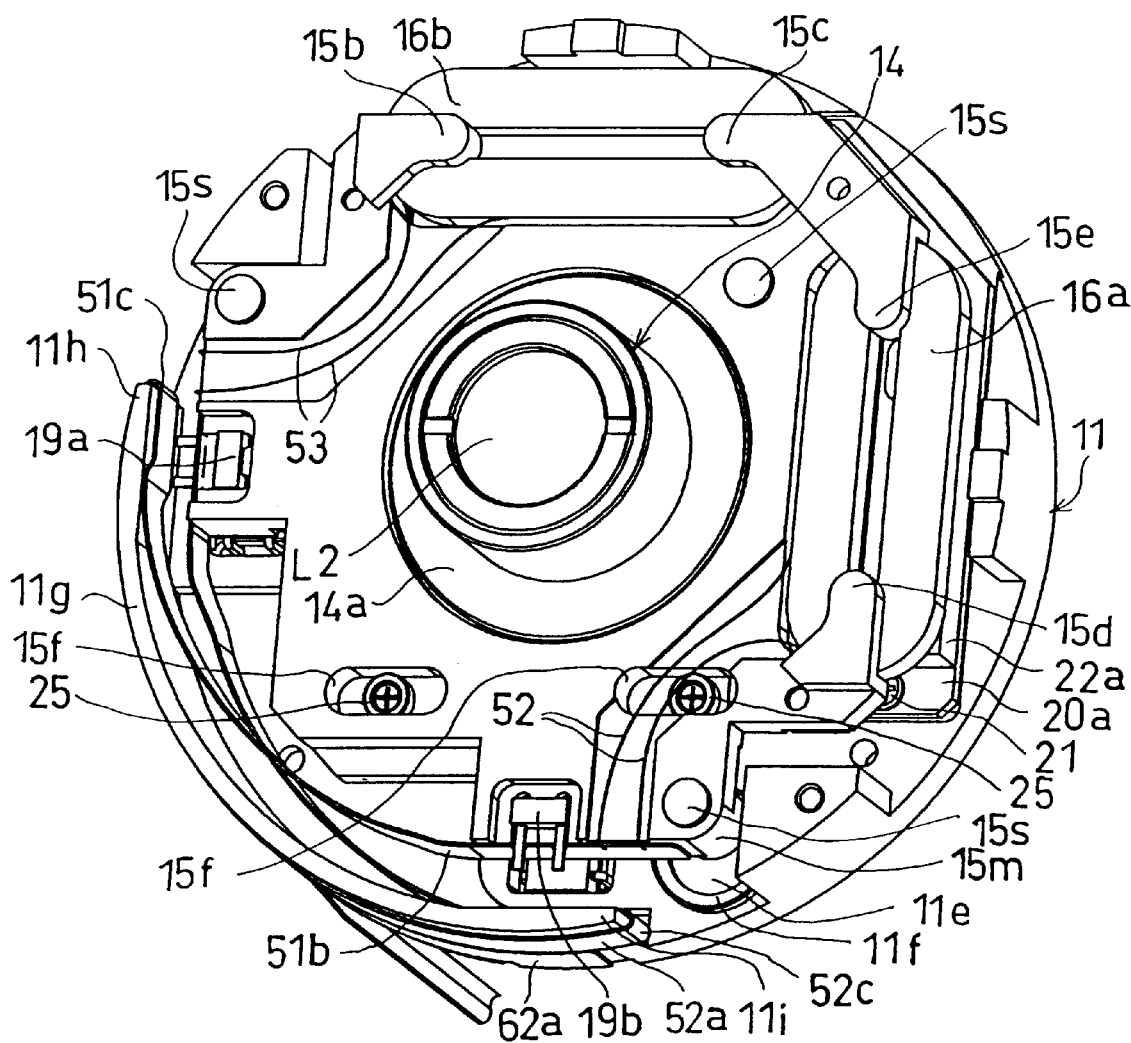
FIG. 11 is a perspective view of the inner portion of the image stabilizer unit shown in FIG. 8.

FIGS. 6 and 9 each show an inner portion of the image stabilizer unit 10 in the case where the movable frame 15 is in a neutral position thereof in a state where no current is supplied to either the first and second coils 16a and 16b. FIGS. 7 and 10 each show the inner portion of the image stabilizer unit 10 in a state where the movable frame 15 is in the movable limit position (compensation limit position) for compensation in one direction (the direction to the right as viewed in FIG. 7) along the X-axis direction. FIGS. 8 and 11 each show the inner portion of the image stabilizer unit 10 in a state where the movable frame 15 is in the movable limit position (compensation limit position) for compensation in one direction (the direction upwards as viewed in FIG. 8) along the Y-axis direction. In FIGS. 6 through 11, the yoke plate 12 is removed from the base 11 for the purpose of illustration.

As can be understood from these drawings, since the first and second wiring strips 52 and 51 of the first flexible PWB 50 are arranged in the image stabilizing unit 10 to intersect each other as viewed from the front of the image stabilizing unit 10 in the direction of the optical axis O, the wiring portions of the first flexible PWB 50 which extend between the movable frame 15 and the base 11 (i.e., the inner strip portions 51b and 52b) are sufficiently long and therefore do not bend very much even if the movable frame 15 moves to a movable limit position in either the X-direction or the Y-direction. Therefore, according to the present embodiment of the image stabilizing unit 10, the influence of the resilient force of each of the first and second wiring strips 52 and 51 of the first flexible PWB 50 on the movable frame 15 while the movable frame 15 is moving is successfully made minimal.

Since no bent portion which bulges towards the movable frame 15 is formed on either the first wiring strip 52 or the second wiring strip 51, it is not necessary to secure a large space for accommodating the first and second wiring strips 52 and 51. Hence, the wiring strip accommodating space "S", which is formed between the peripheral wall 11g and the movable frame 15, does not have to be made large. Moreover, there is no chance of the smooth movement of the movable frame 15 being interrupted by a strong resilient force of such a bent portion which would otherwise bulge toward the movable frame 15.

In the illustrated embodiment, although the second lens group L2 is driven to deviate from the optical axis O to stabilize the object image, the present invention is not limited solely to this particular embodiment. Any other lens group can be driven in the same manner for the same purpose.

In the illustrated embodiment, although the photographic optical system consists of three lens groups, the present invention is not limited solely to this particular embodiment. The present invention can be applied to a photographic optical system having two lens groups, or more than three lens groups.

In the illustrated embodiment, although the first and second pairs of permanent magnet bars 22a and 22b are fixed to the base 11 while the first and second coils 16a and 16b are fixed to the movable frame 15, this arrangement can be reversed. Namely, the first and second pairs of permanent magnet bars 22a and 22b can be fixed to the movable frame 15 while the first and second coils 16a and 16b can be fixed to the base 11.

In the illustrated embodiment, although the first and second PSDs 30a and 30b are fixed to the base 11 while the first and second LEDs 19a and 19b are fixed to the movable frame 15, this arrangement can be reversed. Namely, the first and second PSDs 30a and 30b can be fixed to the movable frame 15 while the first and second LEDs 19a and 19b can be fixed to the base 11. In this reverse arrangement, instead of the first and second LEDs 19a and 19b, the first and second PSDs 30a and 30b can be soldered onto the inner strip portions 52b and 51b of the first flexible PWB 50, respectively.

In the illustrated embodiment, although the variation in position of the movable frame 15 relative to the base 11 in the X-direction is detected by the first position detector composed of the first LED 19a and the first PSD 30a while the variation in position of the movable frame 15 relative to the base 11 in the Y-direction is detected by the second position detector composed of the second LED 19b and the second PSD 30b, the present invention is not limited solely to this particular embodiment. The variation in position of the movable frame 15 relative to the base 11 in the Y-direction can be detected by a combination of the first LED 19a and the first PSD 30a while the variation in position of the movable frame 15 relative to the base 11 in the X-direction can be detected by a combination of the second LED 19b and the second PSD 30b if the first slit 15h is formed on the movable frame 15 to extend in the X-direction, the second slit 15g is formed on the movable frame 15 to extend in the Y-direction, and each of the first and second PSDs 30a and 30b is arranged so that the longitudinal direction of the sensing portion of each PSD extends in a direction perpendicular to the longitudinal direction of the corresponding slit 15h or 15g.

In the illustrated embodiment, although the image stabilizing unit 10 is provided in the camera, the present invention is not limited solely thereto, but can be applied to any viewing optical instruments such as a telescope or a pair of binoculars.

As can be understood from the foregoing, according to the wiring structure of the image stabilizer to which the present invention is applied, since the flexible printed wiring board comprises a first wiring strip and a second wiring strip which firstly extend in opposite directions away from each other along the circumferential direction of the cylindrical base, and subsequently fold back inwardly to extend along the circumferential direction of the cylindrical base towards each folded portion of each respective second and first wiring strips, to be connected with the first electrical element and the second electrical element mounted on the movable member, respectively, after intersecting each other as viewed along the optical axis, the influence of the resilient force of a flexible PWB on the image-stabilizing optical system while it is moving can be made minimal without consuming much space for providing the flexible PWB.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A wiring structure of an image stabilizer, comprising:
    a movable member which supports an image-stabilizing optical system;
    a cylindrical base which supports said movable member to be movable in a plane perpendicular to an optical axis of said image-stabilizing optical system;
    a first drive device which drives said movable member in a first direction perpendicular to said optical axis;
    a second drive device which drives said movable member in a second direction perpendicular to said optical axis, said first direction and second direction being orthogonal to each other;
    a first electrical element associated with said first drive device and a second electrical element associated with said second drive device, said first and second elements being separately mounted on said movable member spaced in a circumferential direction about said optical axis;
    a flexible printed wiring board, one end and the other end of said flexible printed wiring board being positioned inside and outside of said cylindrical base, respectively; and
    said one end of the flexible printed wiring board being provided with a first wiring strip and a second wiring strip which firstly extend in opposite directions away from each other along the circumferential direction about said optical axis, and subsequently fold back inwardly towards each folded portion of each respective second and first wiring strips, to be connected with said first electrical element and said second electrical element, respectively, after intersecting each other as viewed along said optical axis.

2. The wiring structure of an image stabilizer according to claim 1, wherein each of said first wiring strip and said second wiring strip comprises a S-shaped portion in a vicinity of an intersecting portion thereof so that said first wiring strip and said second wiring strip sidestep each other in the direction of said optical axis, respectively.

3. The wiring structure of an image stabilizer according to claim 1, wherein said cylindrical base comprises a peripheral wall which is formed along a circumferential portion thereof;
    wherein each of said first wiring strip and said second wiring strip comprises an outer strip portion positioned along an outer peripheral surface of said peripheral wall of said cylindrical base, and an inner strip portion which is folded back inwardly to be positioned inside said cylindrical base; and
    wherein said inner strip portion of said first wiring strip and said inner strip portion of said second wiring strip intersect each other as viewed along said optical axis.

4. The wiring structure of an image stabilizer according to claim 3, wherein said inner strip portion of said first wiring strip comprises at least one S-shaped portion which is curved so as to bend in the direction of said optical axis so that said inner strip portion of said second wiring strip sidesteps in said direction of said optical axis; and
    wherein said inner strip portion of said second wiring strip comprises at least one S-shaped portion which is curved so as to bend in the direction of said optical axis so that said inner strip portion of said first wiring strip sidesteps in said direction of said optical axis.

5. The wiring structure of an image stabilizer according to claim 4, wherein a portion of said inner strip portions of said first and second wiring strip, other than the intersecting portion, overlap each other in the radial direction of said cylindrical base.

6. The wiring structure of an image stabilizer according to claim 1, wherein said first drive device comprises a first magnet fixed to one of said cylindrical base and said movable member, and a first coil fixed to the other of said cylindrical base and said movable member to face said first magnet; and
    wherein said second drive device comprises a second magnet fixed to said one of said cylindrical base and said movable member, and a second coil fixed to said other of said cylindrical base and said movable member to face said second magnet.

7. The wiring structure of an image stabilizer according to claim 6, wherein said first magnet and said second magnet are fixed to said cylindrical base, and said first coil and said second coil are fixed to said movable member to face said first and second magnets, respectively; and
    wherein said first electrical element and said second electrical element comprise said first coil and said second coil, respectively.

8. The wiring structure of an image stabilizer according to claim 1, wherein
    said first drive device further comprises a first position detector for detecting a variation in position of said movable member relative to said cylindrical base in said first direction; and
    said second drive device further comprises a second position detector for detecting a variation in position of said movable member relative to said cylindrical base in said second direction.

9. The wiring structure of an image stabilizer according to claim 8, wherein said first position detector comprises a first light emitter fixed to one of said cylindrical base and said movable member, and a first one-dimensional PSD fixed to the other of said cylindrical base and said movable member; and
    wherein said second position detector comprises a second light emitter fixed to said one of said cylindrical base and said movable member, and a second one-dimensional PSD fixed to said other of said cylindrical base and said movable member.

10. The wiring structure of an image stabilizer according to claim 9, wherein said first light emitter and said second light emitter are fixed to said movable member, and said first and second one-dimensional PSD are fixed to said cylindrical base; and
    wherein said first electrical element and said second electrical element comprise said first light emitter and said second light emitter, respectively.

11. The wiring structure of an image stabilizer according to claim 9, wherein said first light emitter and said second light emitter are fixed to said cylindrical base, and said first one-dimensional PSD and said second one-dimensional PSD are fixed to said movable member, and wherein said first electrical element and said second electrical element comprise said first one-dimensional PSD and said second one-dimensional PSD, respectively.

12. The wiring structure of an image stabilizer according to claim 9, wherein each of said first light emitter and said second light emitter comprises an LED.

13. The wiring structure of an image stabilizer according to claim 1, further comprising a yoke plate fixed to said cylindrical base, said movable member being positioned between said yoke plate and said cylindrical base.

14. The wiring structure of an image stabilizer according to claim 13, wherein said cylindrical base comprises at least one projection; and wherein said yoke plate comprises corresponding at least one limit stop at which said at least one projection abuts against at the time said movable member moves to a movable limit position thereof relative to said cylindrical base.

15. The wiring structure of an image stabilizer according to claim 1, wherein said image stabilizer is incorporated in a camera.

16. The wiring structure of an image stabilizer according to claim 15, wherein said camera comprises:

first and second gyro sensors for sensing vibration in said first direction and said second direction, respectively; and a controller which supplies drive current to each of id first coil and said second coil, wherein the strength of said drive current is determined in accordance with output of each of said first and second gyro sensors.

17. The wiring structure of an image stabilizer according to claim 15, wherein said image stabilizer is formed as a unit.

18. A wiring structure of an image stabilizer, comprising:

a movable member which supports an image-stabilizing optical system;

a cylindrical base which supports said movable member to be movable in a plane perpendicular to an optical axis of said image-stabilizing optical system;

a first drive device which drives said movable member in a first direction perpendicular to said optical axis;

a second drive device which drives said movable member in a second direction perpendicular to said optical axis, said first direction and second direction being orthogonal to each other;

a first electrical element associated with said first drive device and a second electrical element associated with said second drive device, said first and second elements being separately mounted on said movable member being spaced in a circumferential direction about said optical axis;

a first wiring strip which extends into said cylindrical base from the outside thereof to be connected to said first electrical element;

a second wiring strip which extends into said cylindrical base from the outside thereof to be connected to said second electrical element; and said first wiring strip and said second wiring strip are positioned inside said cylindrical base with said first wiring strip intersecting said second wiring strip as viewed along said optical axis.

19. The wiring structure of an image stabilizer according to claim 18, wherein said first wiring strip and said second wiring strip extend from a common flexible printed wiring board in opposite directions so as to be separate from each other along a circumferential direction about said optical axis.

20. The wiring structure of an image stabilizer according to claim 19, wherein said cylindrical base comprises a peripheral wall which is formed a circumferential portion thereof, and wherein each of said first wiring strip and said second wiring strip is disposed along a peripheral wall of said cylindrical base.

21. The wiring structure of an image stabilizer according to claim 18, wherein said image stabilizer is incorporated in a camera.

22. A wiring structure of an image stabilizer comprising:

a movable member which supports at least one lens group, said movable member being supported so as to be movable in a plane perpendicular to an optical axis of said at least one lens group; and a strip of flexible printed wiring board, one end of which is connected to said movable member; wherein said one end of said strip of said flexible printed wiring board is bifurcated to provide a first wiring strip and a second wiring strip which firstly extend in opposite directions away from each other along a circumferential direction about said optical axis, and subsequently fold back inwardly towards each folded portion of each respective second and first wiring strips, to be connected to said movable member after intersecting each other as viewed along said optical axis.

23. The wiring structure of an image stabilizer according to claim 22, wherein a first electrical element and a second electrical element are separately mounted on said movable member spaced in the circumferential direction, and wherein said first wiring strip and said second wiring trip of said flexible printed wiring board are connected to said first electrical element and said second electrical element, respectively.

24. The wiring structure of an image stabilizer according to claim 23, further comprising:

a first drive device which drives said movable member in a first direction perpendicular to said optical axis; and a second drive device which drives said movable member in a second direction perpendicular to said optical axis, said first direction and second direction being orthogonal to each other; wherein said first drive device comprises said first electrical element and said second drive device comprises said second electrical element.

* * * * *